June 1, 1937.   A. L. RUNYAN   2,082,261
PHONOGRAPH REPEATING, CHARTING, AND PROJECTING MECHANISM
Filed Nov. 4, 1935    13 Sheets—Sheet 1
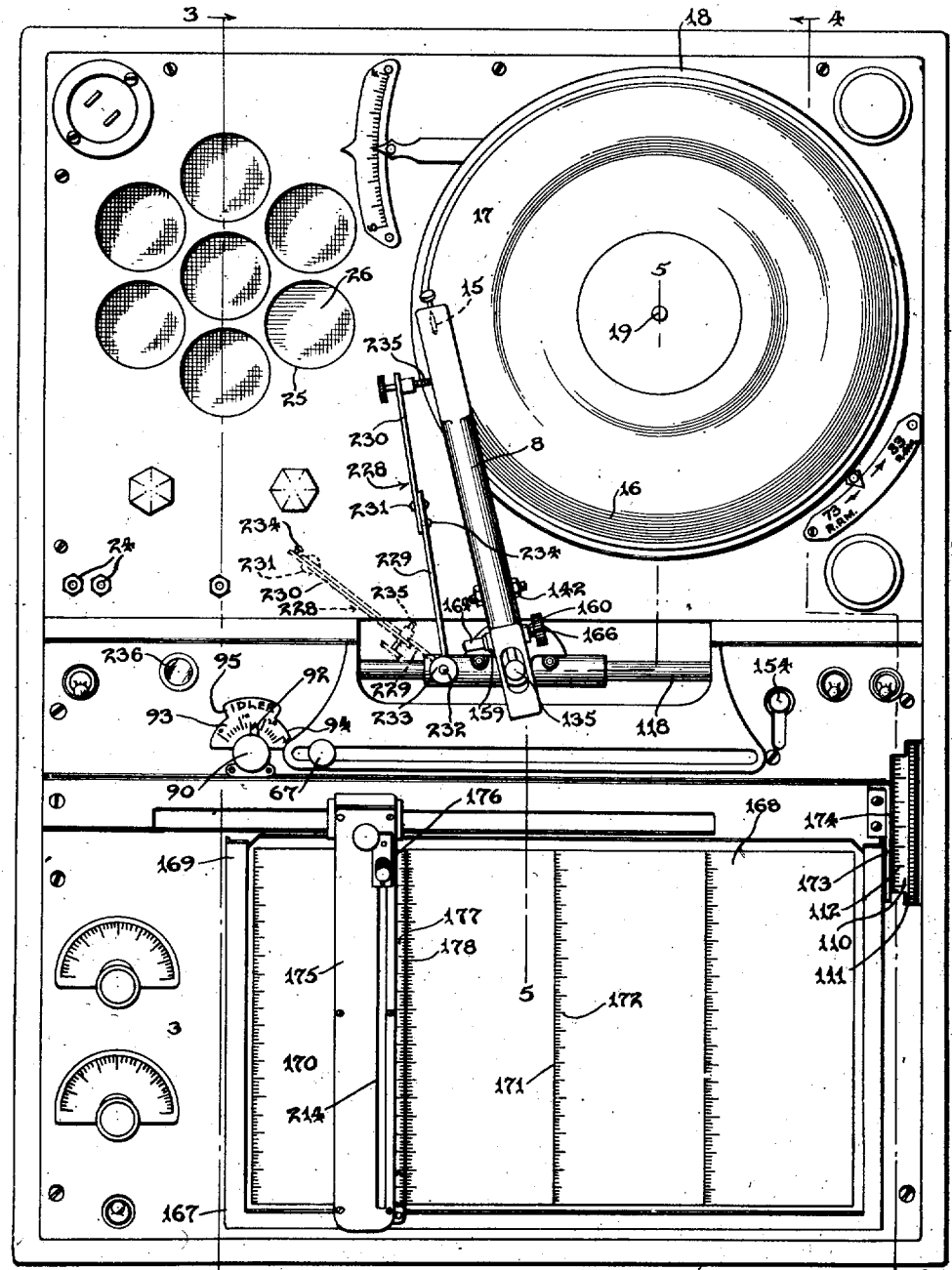
Fig.1.
INVENTOR
Arthur L. Runyan,
BY
ATTORNEY

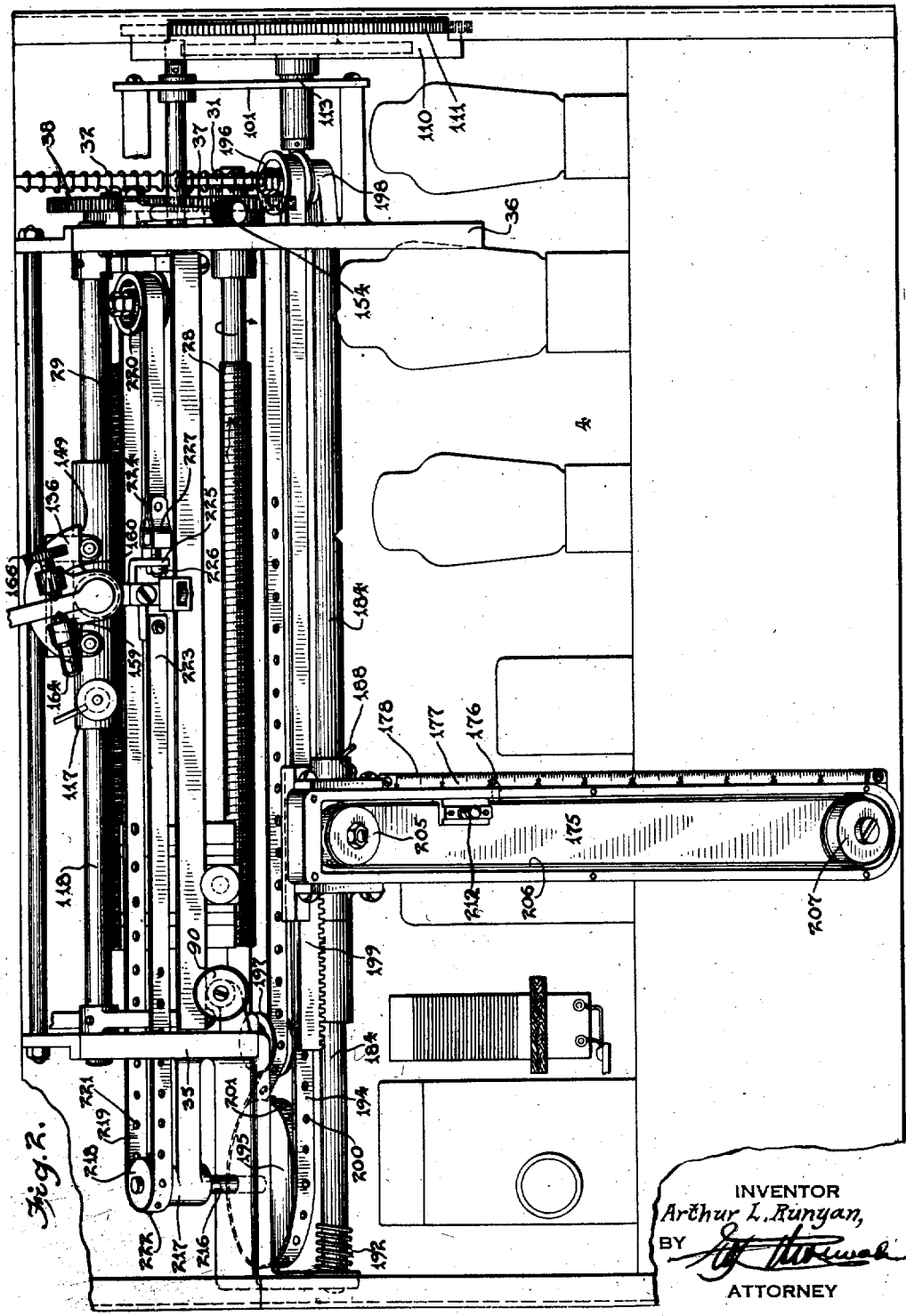

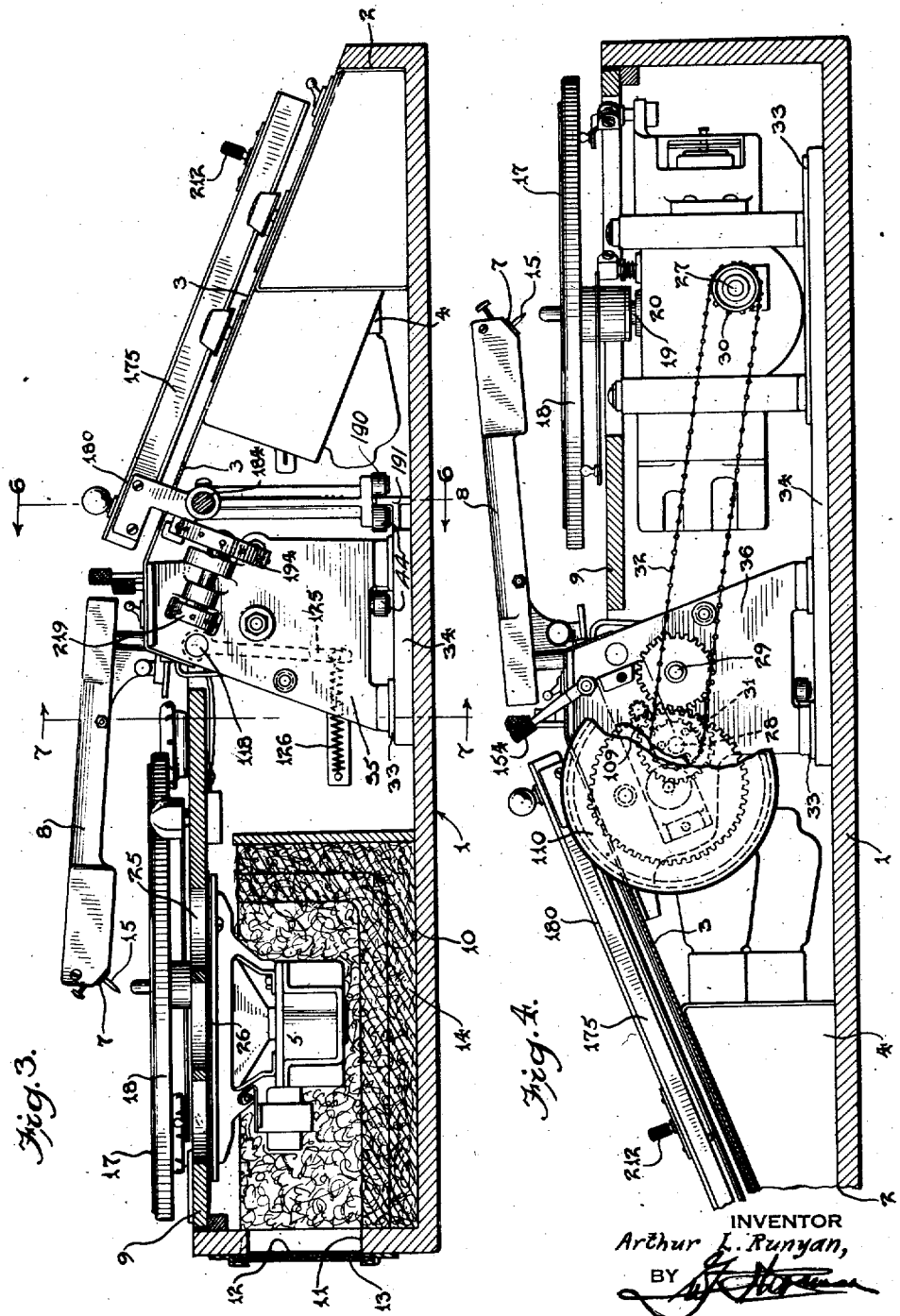

June 1, 1937. A. L. RUNYAN 2,082,261
PHONOGRAPH REPEATING, CHARTING, AND PROJECTING MECHANISM
Filed Nov. 4, 1935 13 Sheets-Sheet 4
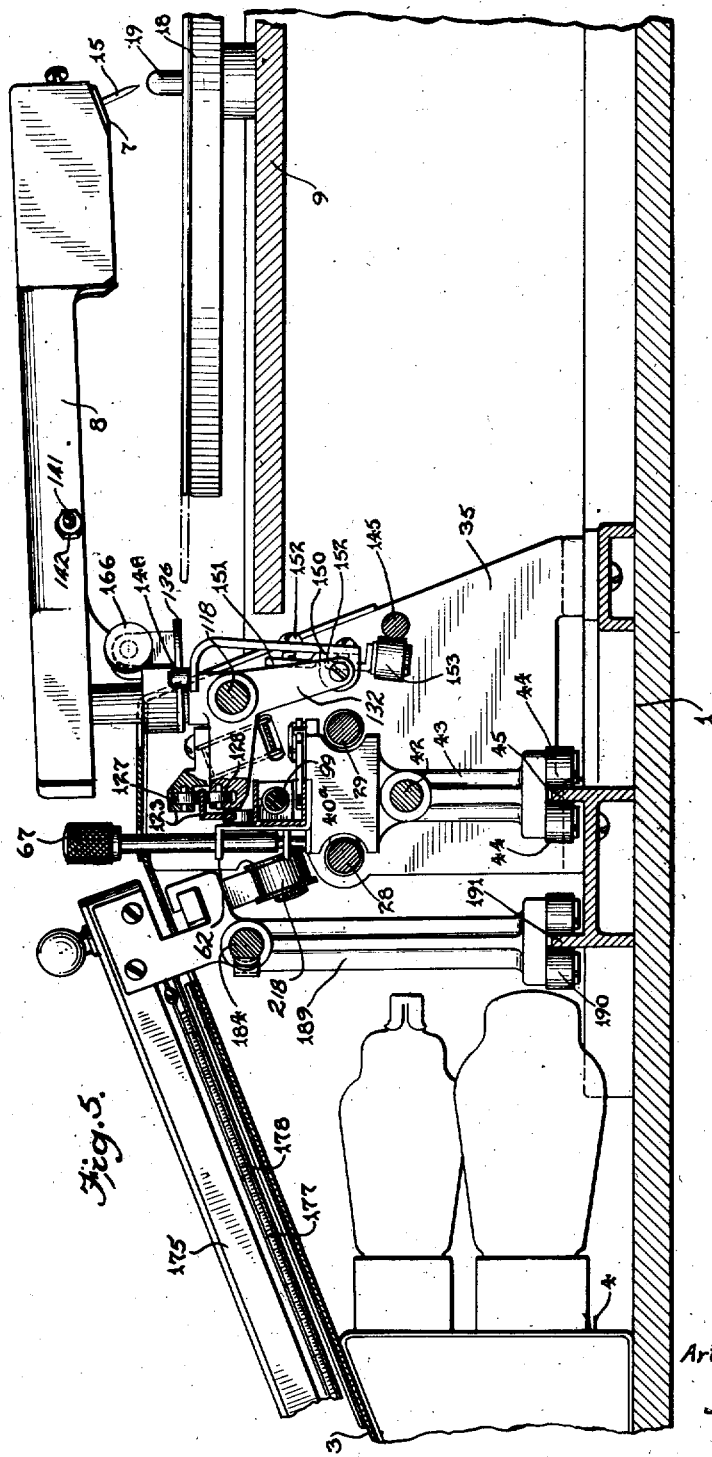
Fig. 5.
INVENTOR
Arthur L. Runyan,
BY 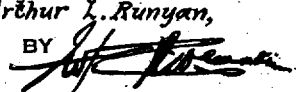
ATTORNEY

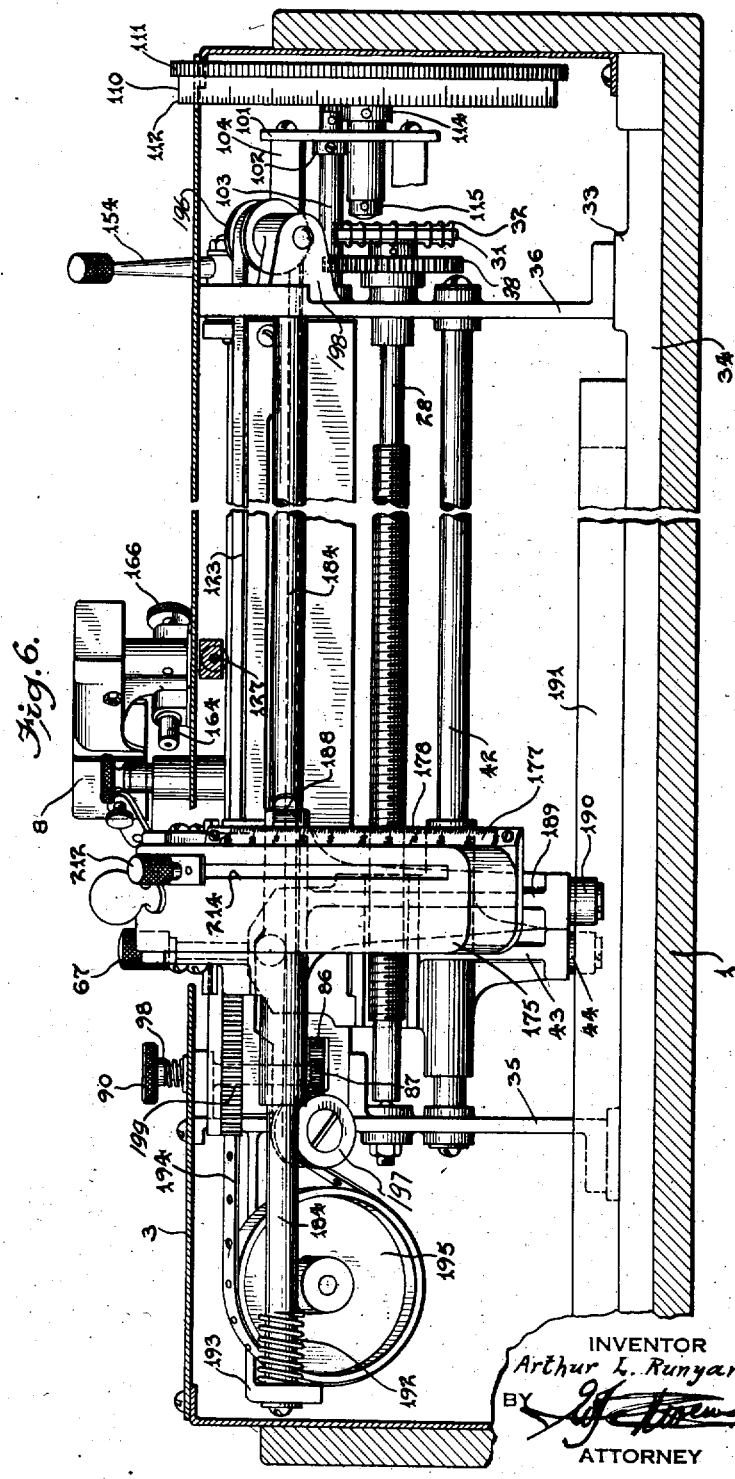

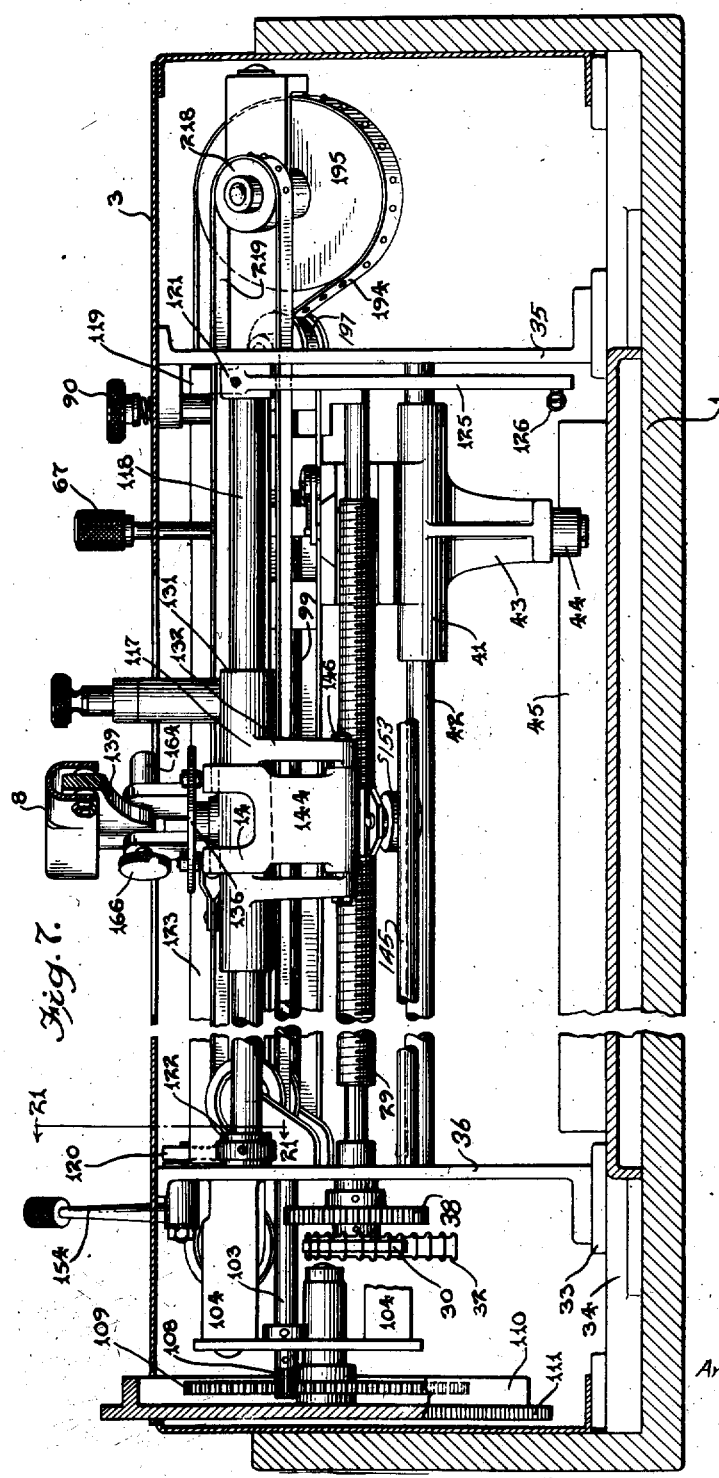

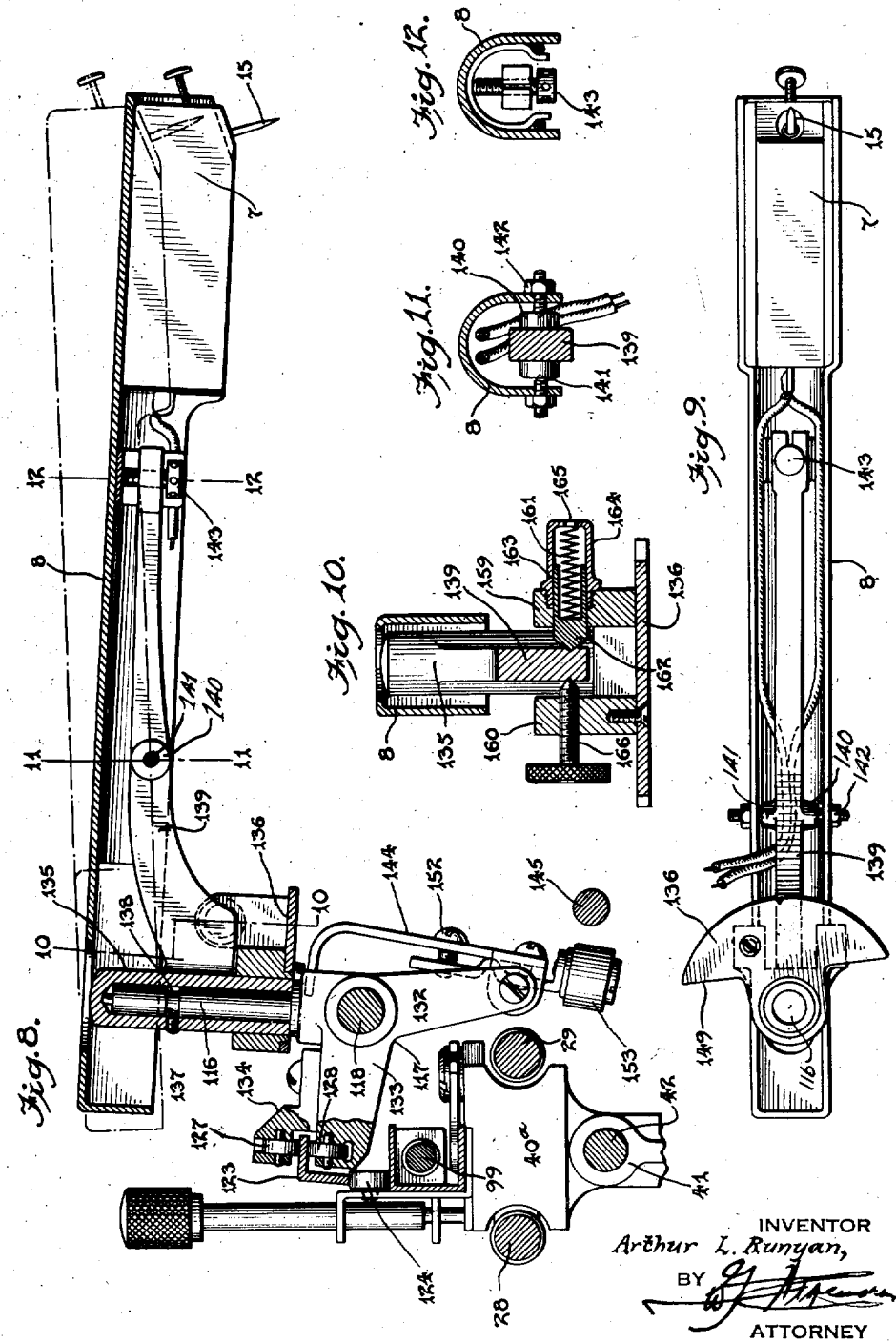

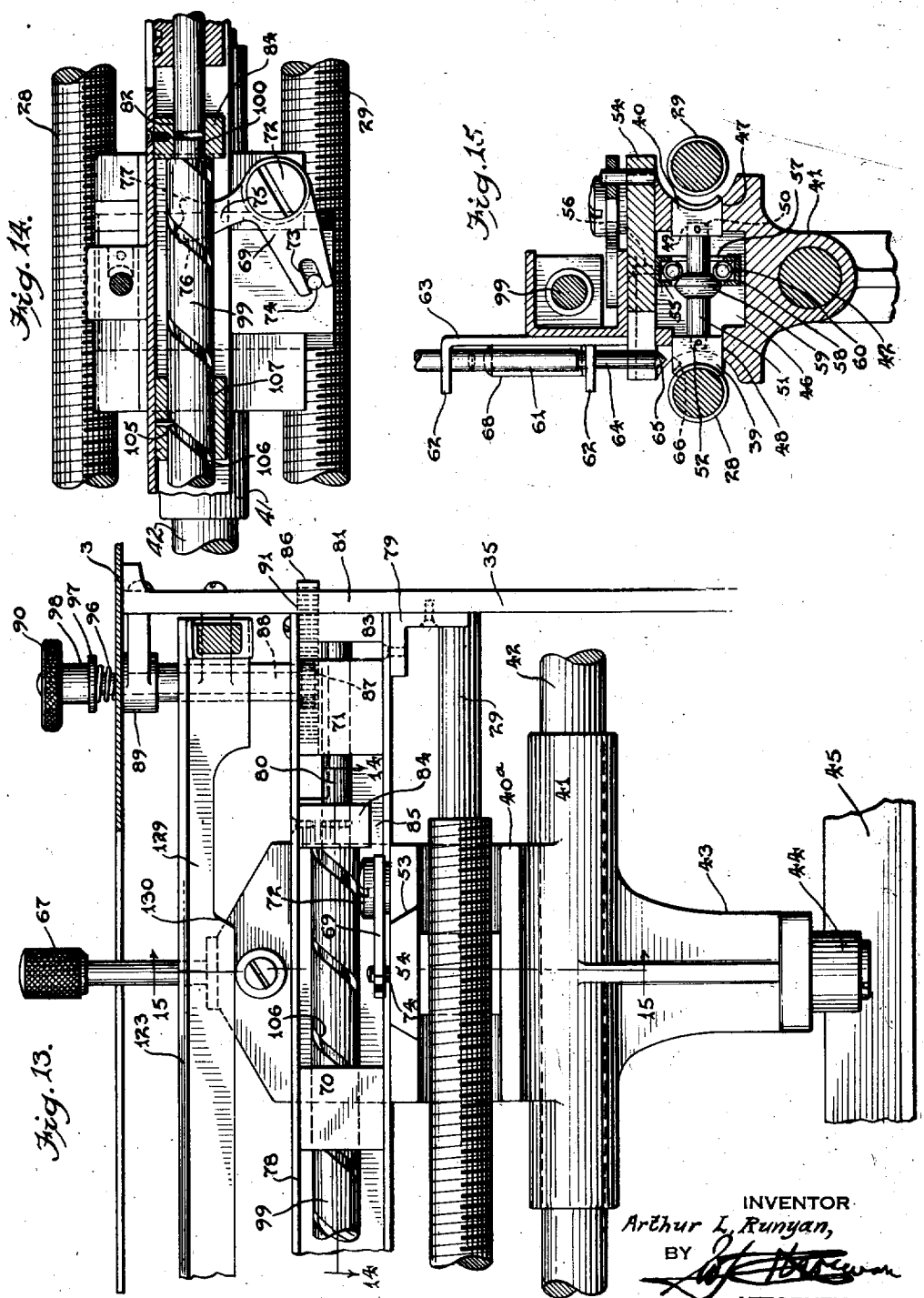

June 1, 1937. A. L. RUNYAN 2,082,261
PHONOGRAPH REPEATING, CHARTING, AND PROJECTING MECHANISM
Filed Nov. 4, 1935 13 Sheets—Sheet 9
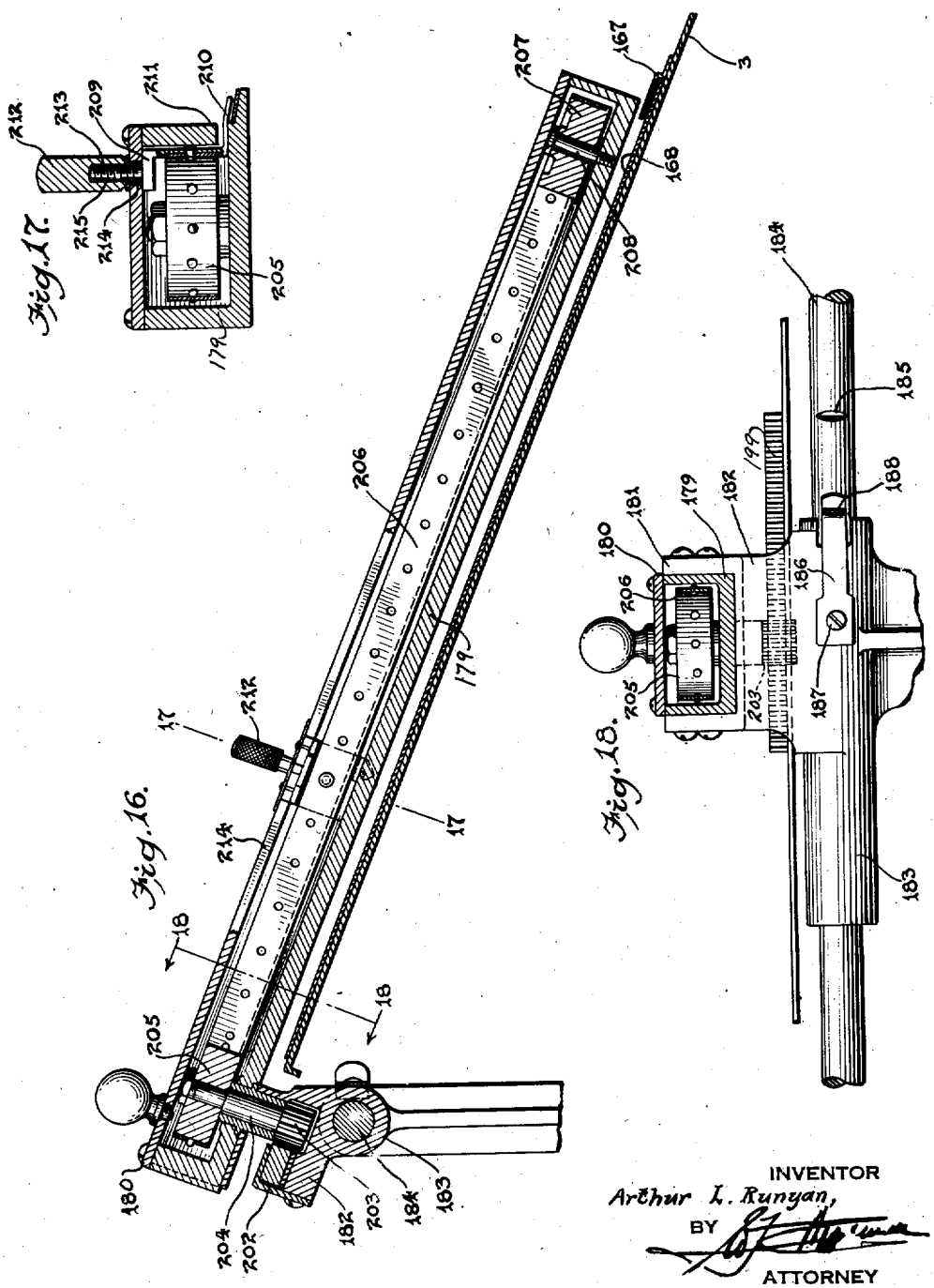
INVENTOR
Arthur L. Runyan,
BY 
ATTORNEY June 1, 1937.   A. L. RUNYAN   2,082,261
PHONOGRAPH REPEATING, CHARTING, AND PROJECTING MECHANISM
Filed Nov. 4, 1935   13 Sheets-Sheet 10

INVENTOR
Arthur L. Runyan,
BY
ATTORNEY

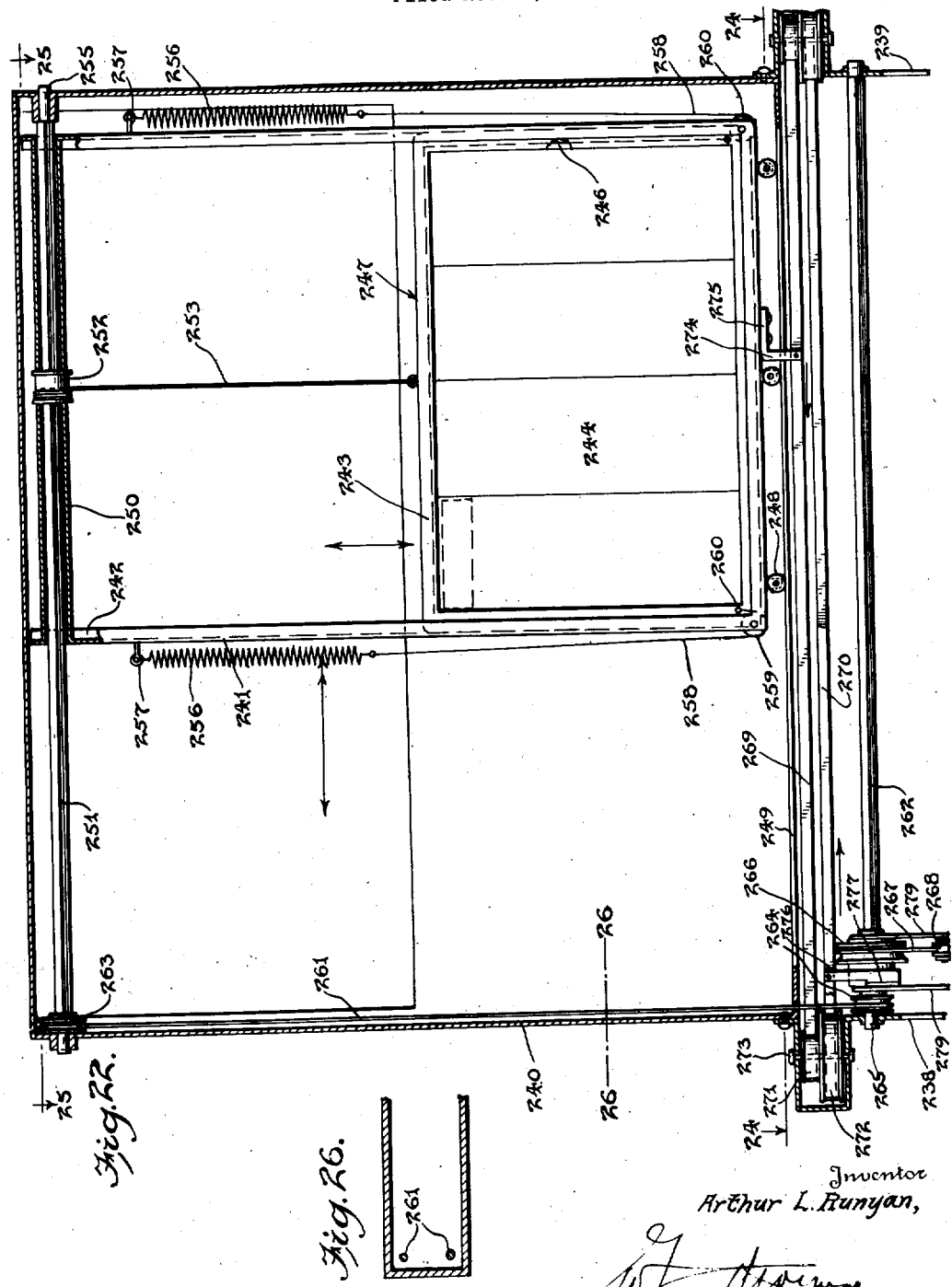

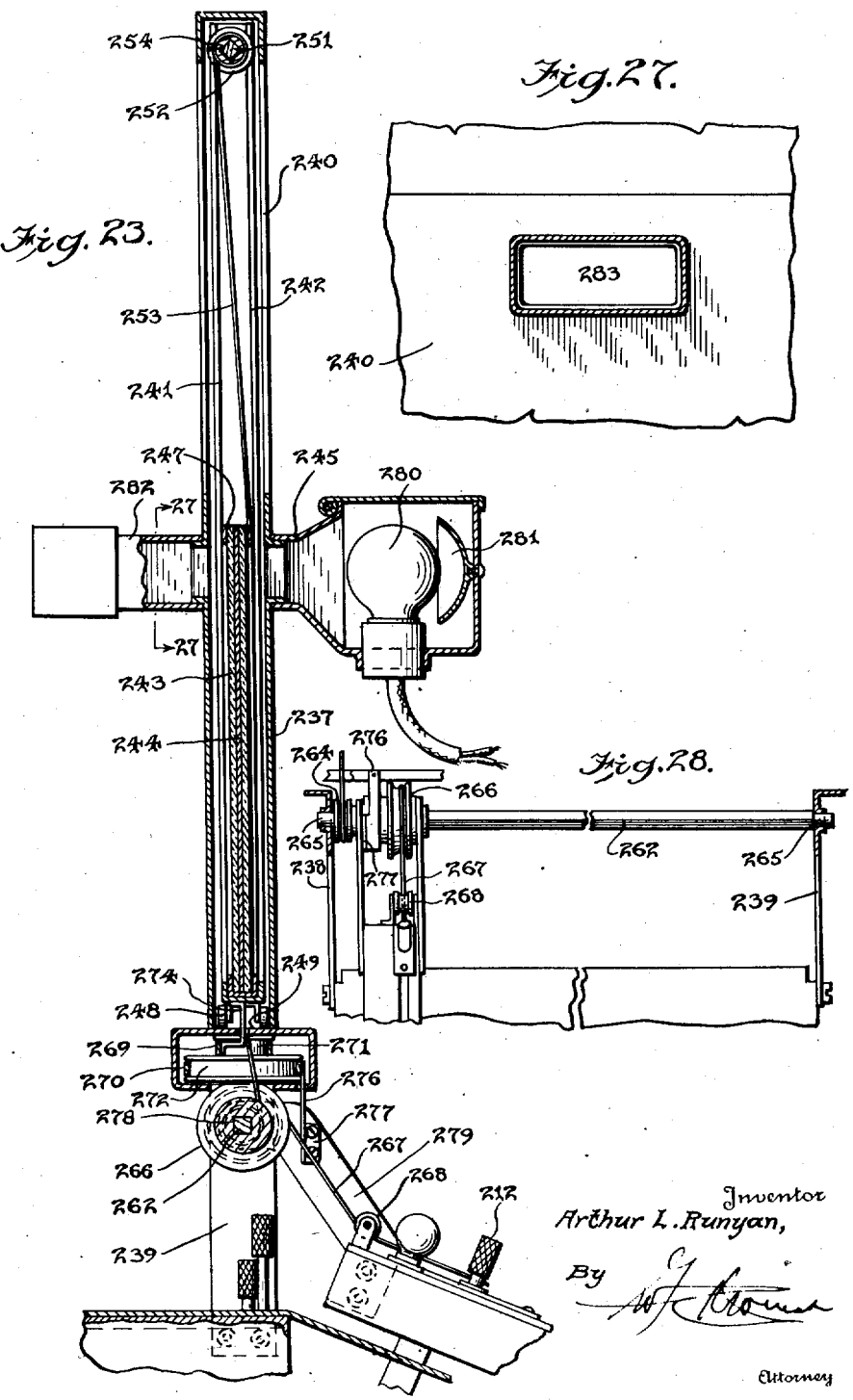

June 1, 1937.  A. L. RUNYAN  2,082,261
PHONOGRAPH REPEATING, CHARTING, AND PROJECTING MECHANISM
Filed Nov. 4, 1935  13 Sheets-Sheet 13
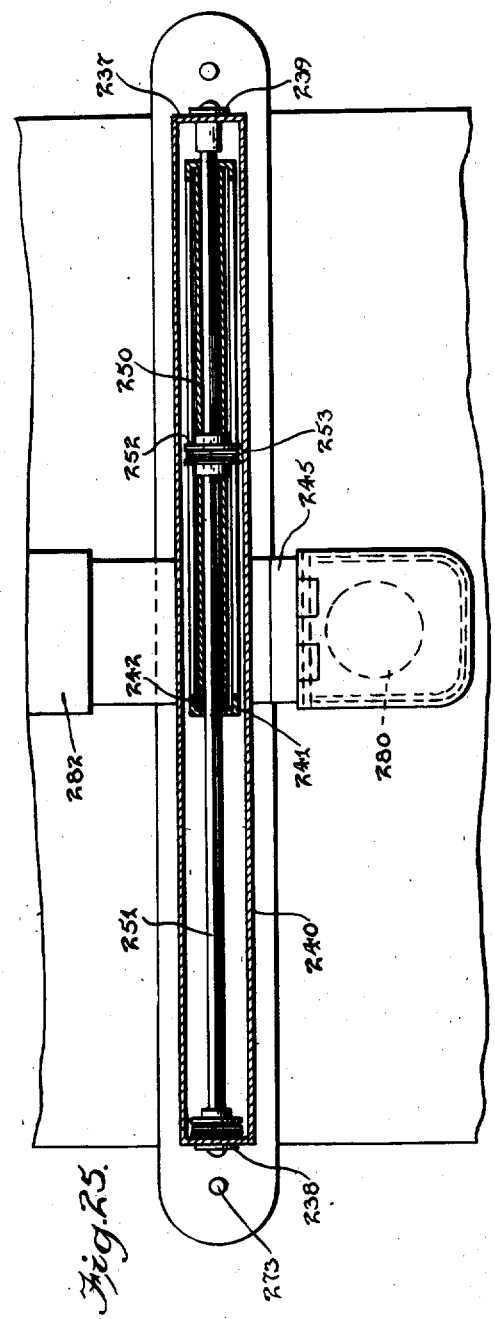
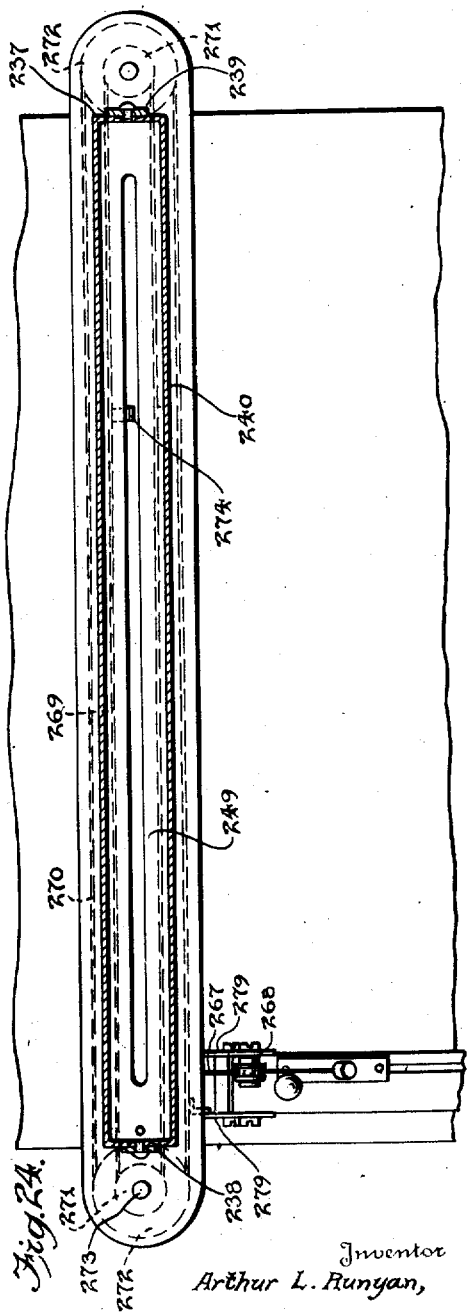
Inventor
Arthur L. Runyan,
By
Attorney Patented June 1, 1937

2,082,261

UNITED STATES PATENT OFFICE 2,082,261

PHONOGRAPH REPEATING, CHARTING, AND PROJECTING MECHANISM

Arthur L. Runyan, New York, N. Y., assignor, by mesne assignments, to Translaphon Corporation, Newark, N. J., a corporation of New Jersey Application November 4, 1935, Serial No. 48,224

58 Claims. (Cl. 274—1)

The invention relates to mechanism for selectively reproducing and automatically repeating sound record material and for charting sound records.

The object of the present invention is to provide simple, accurate and compact mechanism for selectively reproducing and automatically repeating sound record material to facilitate the study of subjects requiring visual and auditory perception, such as languages, music, telegraphic code reception and the like, as well as for various other purposes including cultural education and amusement.

A further object of the invention is to provide mechanism of this character for educational and other purposes wherein graduated numerically indexed charts and sound records of related subject matter are employed and all or selected portions of such related records may be reproduced and automatically repeated continuously as long as desired to effect combined visual and auditory impressions, one familiar and the other unfamiliar, and establish and fix the same in the memory of the student.

Another object of the invention is to provide mechanical means for selectively reproducing and repeating sounds and for teaching the related modes of expression between visual and auditory subject matter by correlating them or bringing them into coaction whereby the selecting of a word or phrase on a chart arranged in a holder so that when a charting indicator is moved to a desired graduated position to register with a word or picture which to the operator is a familiar mode of expression that through a mechanical means the reproducer will select in sound the unfamiliar mode of expression related to the familiar mode of expression on the chart and will repeat the sound as many times as desired by the operator.

A further object of the invention is to provide simple and positive means for selecting the whole or any portion of a sound record to be reproduced and for continuously and automatically repeating the same and for also permitting the idling of the record for varying intervals at the completion of each reproduction of the selected portion of the sound record to provide a silent interval of the desired length within the capacity of the mechanism before each reproduction when desired.

A further object of the invention is to provide simple, practical and efficient means for accurately charting a sound record to provide for such sound record a related graduated numerically indexed chart to enable the mechanism to be accurately set for reproducing and repeating selected portions of said record or the whole thereof.

A further object of the invention is to provide a projector which will be synchronized with the means for selectively producing and automatically repeating sound record material and which will be adapted to show on a screen pictures of selected portions of a chart whereby members of a class or other assembly may simultaneously see on the screen the portion of the chart related to the portion of the sound record being played.

With these and other objects in view, the invention consists in the construction and novel combination and arrangement of parts hereinafter fully described, illustrated in the accompanying drawings and pointed out in the claims hereto appended, it being understood that various changes in the form, proportion and minor details of construction, within the scope of the claims, may be resorted to without departing from the spirit or sacrificing any of the advantages of the invention.

In the drawings:—

Fig. 1 is a plan view of a machine constructed in accordance with this invention and adapted for educational and other purposes.

Fig. 2 is an enlarged plan view of a portion of the machine with the cover plate removed.

Fig. 3 is a vertical longitudinal sectional view taken substantially on the line 3—3 of Fig. 1, the casing being in section and the mechanism being shown in side elevation.

Fig. 4 is a similar view on the line 4—4 of Fig. 1, showing the mechanism in elevation from the opposite side thereof.

Fig. 5 is a vertical longitudinal sectional view of a portion of the machine on a somewhat larger scale taken substantially on the line 5—5 of Fig. 1.

Fig. 6 is a transverse sectional view on the line 6—6 of Fig. 3.

Fig. 7 is a similar view on the line 7—7 of Fig. 3.

Fig. 8 is a longitudinal sectional view of the tone arm and the associated parts.

Fig. 9 is a reverse plan view of the tone arm.

Fig. 10 is a transverse sectional view of the same on the line 10—10 of Fig. 8.

Fig. 11 is a similar view on the line 11—11 of Fig. 8.

Fig. 12 is a transverse sectional view of the tone arm on the line 12—12 of Fig. 8.

Fig. 13 is an enlarged detail view illustrating the construction of the repeat mechanism.

Fig. 14 is a horizontal sectional view of the same taken substantially on the line 14—14 of Fig. 13.

Fig. 15 is a vertical sectional view of the repeat mechanism taken substantially on the line 15—15 of Fig. 13.

Fig. 16 is an enlarged longitudinal sectional view taken through the charting arm.

Fig. 17 is a transverse sectional view of the same on the line 17—17 of Fig. 16.

Fig. 18 is a similar view on the line 18—18 of Fig. 16 looking in the direction of the arrow.

Fig. 21 is a detail view of the manually operable means for actuating the mechanism for raising and lowering the tone arm.

Fig. 22 is a vertical longitudinal sectional view of the device for projecting on a screen the selected portions of a picture of the chart over which the charting mechanism moves.

Fig. 23 is a central vertical sectional view of the same taken at right angles to Fig. 22.

Fig. 24 is a horizontal sectional view taken on the line 24—24 of Fig. 22.

Fig. 25 is a horizontal sectional view taken on the line 25—25 of Fig. 22.

Fig. 26 is a detail horizontal sectional view on the line 26—26 of Fig. 22.

Fig. 27 is a detail sectional view taken on the line 27—27 of Fig. 23.

Fig. 28 is a detail sectional view illustrating the manner of mounting the picture projecting device on the casing or cabinet 1 of the machine.

Figure 20:
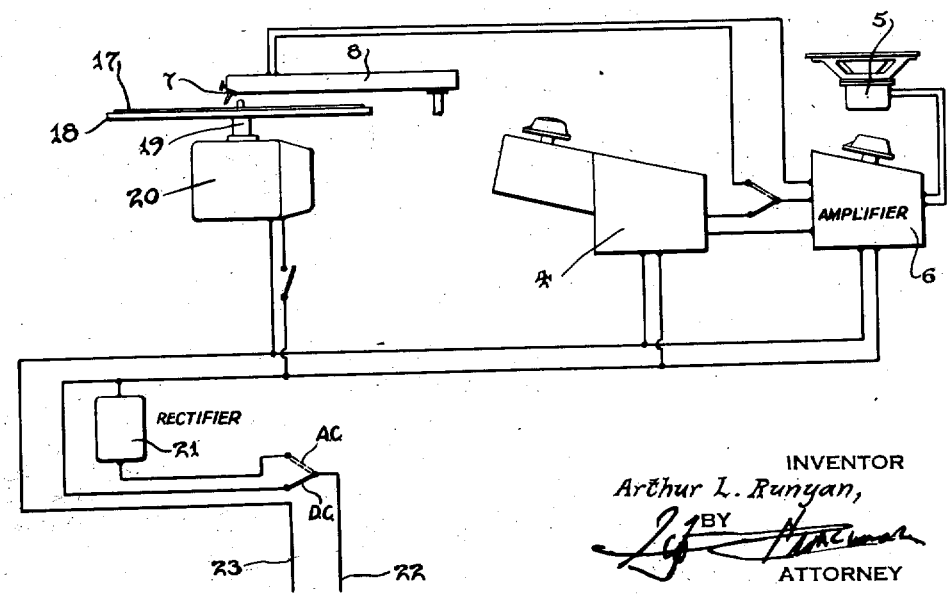
Fig. 20 is a diagrammatic view illustrating the arrangement of the principal circuits of the machine.

Referring to the drawings in which is illustrated one embodiment of the invention, 1 designates a casing or cabinet designed particularly for a portable machine, but the cabinet of the machine may be of any other preferred form and as elaborate as desired. The cabinet which is rectangular in plan view as illustrated in Fig. 1 of the drawings, has a tapered front portion 2 to provide an inclined top at the upper edges of the casing for the reception of a removable inclined cover plate 3 which is adapted to be readily taken off to afford access to the interior of the cabinet. The cabinet is equipped with a radio receiving set 4 which with the exception of the dynamic loud speaker 5 is preferably located within the inclined front portion of the cabinet, as illustrated diagrammatically in Fig. 20 of the drawings. As the radio receiving set may be of any preferred construction, detail description and illustration thereof are deemed unnecessary. The amplifier 6 or amplifying unit of the radio receiving set is connected in the usual manner with the pickup 7 of the tube arm 8 of the sound reproducer.

The loud speaker 5 which is attached to and suspended from a motor board 9 is preferably arranged, as shown in Fig. 3, in a compartment 10 at the rear portion of the cabinet which is provided at the rear wall with an opening 11 for the passage of the sound waves. The opening 11 is preferably covered by a screen 12 and with a cloth 13 in the usual manner. In order to cushion the air currents or waves produced by the operation of the loud speaker and improve the tone quality of sound reproductions and prevent the machine from being vibrated by the same a cushion lining 14 is arranged within the compartment 10 and partially surrounds the loud speaker. The cushion lining may consist of one or more layers of cotton batting or other suitable material, and it is arranged at opposite sides of the compartment and at the inner end of the same and at the bottom thereof, an open space being provided between the loud speaker and the opening.

The pickup 7 of the tone arm 8, best shown in Figs. 8 and 9 of the drawings, may be of any preferred form such as crystal or magnetic, and the reproducer stylus 15 operatively engages the continuous groove 16 of a sound record 17 of the ordinary construction. The sound record 17, as clearly illustrated in Fig. 4, is arranged on and is carried by a turntable 18 which is removably fitted on the spindle 19 of an electric motor 20. The spindle 19 extends through the motor board 9 and the motor is wired for D. C. and A. C. currents, suitable switches being provided for the motor circuit and the radio receiving set, as indicated in the wiring diagram shown in Fig. 20. A rectifier 21 is provided for rectifying the current for the radio receiving set when the feed wires 22 and 23 supply an alternating current. The radio receiving set is also provided with jacks 24 for plugging in a head set when it is desired to use the machine without operating the loud speaker. As the switches for controlling and operating the radio receiving set and for starting and stopping the motor may be of any desired construction and arrangement, detail description and illustration thereof are deemed unnecessary. The motor board 9 extends over and covers the compartment 10 in which the loud speaker is arranged and it is provided with suitable openings 25 covered by a cloth 26 and adapted to permit sound vibrations to pass upwardly from the loud speaker. The means for controlling the motor and regulating the speed of rotation of the turntable are of the usual construction and therefore do not require detail explanation and illustration herein.

The electric motor which is suitably secured at the bottom of the cabinet is provided with a side shaft 27 connected by reducing gearing (not shown) with the motor shaft. The side shaft 27 transmits motion by suitable gearing to one of a pair of horizontal transversely disposed feed screws 28 and 29 of repeat mechanism. Any suitable gearing may be employed for this purpose and in the accompanying drawings sprocket gearing is provided for this purpose and comprises a sprocket pinion 30 suitably fixed to the shaft 27, a sprocket pinion 31 keyed or otherwise secured to one end of the feed screw 28 and a sprocket chain 32 arranged on and meshing with the sprocket pinions 30 and 31 extending forwardly from the motor to the said feed screw 28 as clearly shown in Fig. 4 of the drawings. When the electric motor is operated the turntable and the sound record are rotated and the repeat mechanism is simultaneously actuated for permitting a predetermined number of revolutions of the turntable and then lifting the tone arm from the turntable to return the same to its starting position as hereinafter fully described. The rotation of the turntable is synchronized with the operation of the repeat mechanism and when the motor is started the repeat mechanism is placed in operation and when the motor is stopped the repeat mechanism is also stopped.

The feed screws are journaled in suitable bearings of a metal supporting frame 33 which also constitutes the means for securing the electric motor to the bottom of the cabinet. The supporting frame which may be of any desired construction comprises a base 34 and upright end portions 35 and 36. The feed screws are mounted in the end portions of the frames and they are reversely rotated, intermeshing spur gears 37 and 38 being keyed or otherwise fixed to the shafts 28 and 29, respectively as indicated in Fig. 2 of the drawings. Motion is transmitted from the electric motor to the feed screw 28 which is rotated in the direction of the arrow in Fig. 2 of the drawings, and the intermeshing gears 37 and 38 rotate the feed screw 29 in a reverse direction. The feed screws are continuously operated during the rotation of the turntable and the sound record carried thereby and they are adapted through shiftable half nuts 39 and 40 (see Fig. 15) to actuate a traveler 40a and move the same to the right a predetermined distance and then to the left the same distance to return the traveler to its initial or starting position. The movement of the traveler first by one of the feed screws and then by the other feed screw determines the number of revolutions the sound record is permitted to make before the tone arm is lifted from the sound record and returned to its starting position. By varying the distance the traveler is permitted to slide, varying amounts of the sound record may be repeated so that the whole or any part of a sound record may be selected for reproduction and continuous automatic repeating as long as desired.

The traveler (see Figs. 13 and 15) consists of a block, preferably a casting provided with an integral horizontal sleeve 41 through which passes a fixed guide rod 42 on which the sleeve slides and which connects the end portions of the supporting frame. The traveler is also provided with a depending arm 43 extending from the central portion of the sleeve and provided with spaced rollers 44 located at opposite sides of a guide flange 45 formed integral with the base of the frame and constituting a rail against which the rollers 44 slide. The arm 43 and the rollers prevent the traveler from turning on the guide rod 42 and maintain the traveler in its proper upright position.

The upper portion of the traveler is approximately rectangular and is hollow to form a chamber 46 and it is provided at opposite sides thereof with openings 47 and 48 forming guides for the half nuts 39 and 40 as clearly shown in Fig. 15. The guide openings 47 and 48 are rectangular and present smooth flat faces to the top, bottom and sides of the half nuts which are also rectangular to fit the guide openings. The half nuts are provided at their inner faces with sockets 49 for the reception of reduced ends 50 of a transverse stem 51 detachably secured to the half nuts by pins 52 or other suitable fastening means to permit the parts to be readily assembled and separated. The block is also provided at the top with a transversely disposed dovetail way 53 forming a guide for a dovetail slide 54 consisting of a plate beveled at the side edges, as clearly illustrated in Fig. 13 of the drawings. The way 53 is formed by a recess having beveled undercut side walls and the slide which is moved back and forth by the means hereinafter described carries a substantially rectangular cage 55 secured by screws 56 to the lower face of the slide 54 and arranged interiorly of the traveler in the chamber 46 thereof, as clearly shown in Fig. 15 of the drawings. The screws 56 are countersunk in the slide and the cage 55 which fits against the lower face of the slide 54 is provided with a central opening 57 and it has an annular groove 58 surrounding the opening 57 which is circular. The stem 51 which connects the shiftable half nuts extends through the cage and is provided with a centrally arranged oppositely beveled collar 59. The collar 59 is engaged at one side or the other by an annular coiled spring 60 located in the annular groove 58 of the cage and the latter is adapted to be shifted from one side of the central portion of the periphery of the collar to the opposite side thereof for shifting the half nuts to carry one of the half nuts out of engagement with one of the feed screws and to carry the other half nut into engagement with the other of the feed screws. When the slide 54 is moved from one of its positions to the other the coil spring 60 is expanded in the annular groove 58 and as soon as it passes over the central portion of the periphery of the oppositely beveled collar and is moved from one beveled face to the other, the spring acts on the latter beveled face and causes the stem and the half nuts to be shifted to move one of the half nuts out of engagement with one of the feed screws and to cause the other half nut to engage the other feed screw for reversing the direction of movement of the traveler. The half nuts are also adapted to be manually moved to a neutral position with both of the half nuts out of engagement with both of the feed screws for stopping the sliding movement of the traveler.

The manual adjustment or movement of the shiftable half nuts to carry the same to a neutral position is effected by means of a depressible stem 61 mounted in vertically aligned guides 62 of a bracket 63 which is mounted on the traveler, as clearly shown in Fig. 13 of the drawings. The lower portion 64 of the stem is reduced and is provided with a cone shaped lower terminal 65 which is located above a conical recess 66 in the upper face of the half nut 39. The conical end 65 is located off center with respect to the conical recess 66 when either of the half nuts is in engagement with one of the feed screws and when the stem 61 is depressed the inclined surface of its lower end engages the inclined surface of the conical recess 66 and moves the shiftable half nuts 39 and 40 and connecting stem 51 a sufficient distance to cause the threads of the half nuts to clear the threads of the feed screws. This will prevent the feed screws from actuating the traveler which will remain stationary while the depressible stem 61 is maintained in engagement with the conical recess 66 of the half nut 39. The depressible stem is provided at its upper end with a knurled head 67 and it is maintained in an elevated position through friction produced by a device 68 mounted on the bracket 63 and frictionally engaging the upper portion of the depressible stem. The friction device 68 conforms to the configuration of the stem 61 and may be constructed of any suitable material and it is adapted to maintain the depressible stem in its elevated position and also in its depressed engaging position for holding the half nuts in their neutral position. The stem 61 is adapted to be depressed by hand to disengage the feed screw engaged half nut and to move the half nuts to their neutral position. The friction device will hold the depressible stem 61 against upward movement to maintain the half nuts in such position and when the depressible stem is raised by the operator it will maintain the stem in its elevated position.

The slide is automatically shifted to operate the half nuts by means of a bell crank lever 69 and spaced blocks 70 and 71 (see Fig. 13). The bell crank lever which is approximately L-shaped is fulcrumed at its angle on the traveler by means of a screw 72 or other suitable pivot as clearly shown in Fig. 14. One of its arms is provided with a slot 73 extending inwardly from the outer end of the arm and receiving a pin 74 extending upwardly from the slide 54 forming a pivotal connection between the slide and the bell crank lever. The other arm of the bell crank lever extends between the blocks 70 and 71 which are adapted to be spaced apart at different distances for controlling the distance the traveler 40ª moves in traversing the space between the blocks 70 and 71. Viewed by the operator at the front of the machine the traveler is moved to the right by the feed screw 28 until the arm 75 of the bell crank lever is carried into contact with the block 70 which forms an adjustable stop for the bell crank lever and which causes the bell crank lever through the sliding movement of the traveler to be swung on its pivot 72 and actuate the slide 54 which operates the means for shifting the half nuts to carry the half nut 39 out of engagement with the feed screw 28 and move the other half nut 40 into engagement with the feed screw 29. This reverses the direction of movement of the traveler and causes the traveler to move to the left until the bell crank lever 69 is again swung on its pivot 72 through contact with the block 71 which constitutes a stop for the bell crank lever in the left hand movement of the traveler. The arm 75 of the bell crank lever is provided at its outer end with rounded block engaging portions 76 and 77 and the end of the arm is cut away slightly so that the rounded portions 76 and 77 are located at different distances from the axis of the bell crank lever to provide a slight differential in the movement of the bell crank lever by the stop blocks. The rounded portions 77 which provide in effect a shorter arm than the rounded portion 76 produces a quicker movement of the half nuts than the rounded portion 76.

The stop blocks 70 and 71 which are rectangular in cross section are mounted for sliding movement in a guide consisting of a channel bar 78 (see Fig. 14) supported at its ends by brackets 79 secured to the end portions of the supporting frame and also to the channel bar 78 by suitable fastening devices. The left hand block 71 which is normally stationary is adjustable to provide for a period of idling of the sound record and of silence at the end of each selected reproduction of the whole or a portion of the same. The block 71 is mounted on a fixed horizontal guide rod 80 located within the channel bar 78 (see Fig. 13) and secured at its ends in openings 81 and 82 of fixed supporting blocks 83 and 84 secured to the channel bar and located respectively at the left hand end of the channel bar and at a point slightly spaced from the left hand end of the bar, as clearly illustrated in Fig. 13 of the drawings. The supporting block 84 is located between the stop blocks 70 and 71 and it is secured to the upper web or flange of the channel bar and is spaced from the lower web or flange of the channel bar to provide an intervening space 85 for the passage of the bell crank lever to enable the arm 75 thereof to pass beneath the supporting block 74 and move into engagement with the stop block 71. When the traveler in its left hand movement reaches a position sufficient to cause an operation of the bell crank lever when the block 71 is at the limit of its inward adjustment, the tone arm is lifted from the sound record and returned to its initial starting position. Should it be desired to provide a silent period between sound reproductions the stop block 71 is adjusted outwardly from the limit of its inward adjustment so that it will be necessary for the traveler to move a greater distance to effect a shifting and reversal of the half nuts. This adjustment of the stop block 71 is effected by means of a rack and pinion device. The block 71 is provided with a horizontal rack bar 86 (see Fig. 6) which meshes with a pinion 87 secured to the lower end of a manually operable shaft 88 journaled in a bearing bracket 89 of the supporting frame and provided at its upper end with a disk shaped head or knob 90 adapted to be readily turned by the operator to slide the stop block 71 inwardly or outwardly. The rack bar 86 extends beyond the stop block and the adjacent end portion of the frame is provided with a suitable opening 91 through which the rack bar projects when the stop block is moved outwardly to or beyond the position shown in Fig. 13. This extended portion of the rack bar provides a rack bar of sufficient length to enable the block 71 to be adjusted to the limit of its inward movement which is at a point contiguous to the supporting block 84. The shaft 88 is provided with an indicating pointer 92 (see Fig. 1) arranged to move over an arcuate scale 93 consisting of numbered graduations preferably provided on a segmental plate 94 which is provided with an extension 95 designed to bear the word Idler as shown in Fig. 1 of the drawings. The pointer 92 and the scale 93 indicate the number of revolutions of the sound record disk prior to the starting of the reproduction of the whole or any selected portion of the sound record. By adjusting the block 71 inwardly or outwardly the silent or idling period of the sound record may be varied. The stop block 71 is retained in its adjustment by means of a friction device comprising a coil spring 96 and a friction disk 97. The spring 96 is disposed on the shaft 88 and is interposed between the cover plate 3 and the friction disk 97, which is in the form of a washer. The friction disk 97 is arranged on the shaft 88 and it frictionally engages a shoulder 98 of the shaft 88, as clearly shown in Fig. 13 of the drawings. Any other suitable means, may, of course, be employed for retaining the stop block 71 in its adjustment. The friction device, however, permits of ready adjustment of the block and is automatic in its action in holding the parts after an adjustment has been effected. The right hand stop block 70 is adjusted longitudinally of the channel bars 78 by means of a worm 99 (see Figs. 13 and 14) provided at one end with a reduced portion 100 which is journaled in the supporting block 84 and is slightly spaced from the inner end of the horizontal guide rod 80. The other end of the worm is supported in an extension bearing 101 and is provided with a set collar 102 which fits against the supplemental bearing 101 and retains the worm 99 against longitudinal movement. The worm 99 is provided at the right hand end with a smooth extension 103 on which the set collar is arranged and the supplemental bearing 101 is arranged in spaced relation with the adjacent end portion of the supporting frame and is supported by the same, suitable supporting arms 104 being provided for this purpose. The supplemental or auxiliary bearing forms an extension of the frame and may, of course, be of any desired construction. The adjustable stop block 70 which is held against rotary movement by the channel bar guide 78 is provided with a suitable projection 105 extending into the groove 106 of the worm, as clearly illustrated in Fig. 14 of the drawings. Any suitable means may be provided for engaging the stop block 70 with the groove of the worm. The block 70 is provided with an opening 107 to receive the worm and is slides on the same when the worm is rotated. The right hand end of the worm shaft has keyed or otherwise secured to it a spur pinion 108 which meshes with a spur gear wheel 109 suitably fixed to a graduated wheel 110 (see Figs. 4 and 6) preferably provided with a peripheral flange 111 to facilitate its manual operation and having numbered graduations 112 ranging from 0 to 400 to correspond approximately with the pitch grooves or convolutions of the continuous spiral groove of a sound record. The graduations of the wheel 110 may be of any desired number and ordinarily 400 graduations will be ample as generally the maximum number of pitch grooves of a 12 inch sound record is approximately 400. The graduated manually operable wheel is provided with a graduation corresponding with each of the pitch grooves of the sound record 17 and the graduated wheel is adapted to be operated to space the adjustable stop block 70 the necessary distance from the stop block 71 for reproducing the whole or any selected portion of a sound record. The graduated wheel is mounted on a short shaft 113 which is journaled in the supplemental bearing or extension 101 of the supporting frame, suitable set collars 114 and 115 being preferably provided for this purpose but the graduated wheel may be mounted in any other desired manner, as will be readily understood.

The tone arm 8 is mounted for horizontal swinging movement on an upright spindle 116 of a slidable tone arm carriage 117 (see Figs. 5 and 8) which is mounted for sliding movement on a round horizontal guide rod 118 journaled at its ends in suitable bearings of the upstanding end portions of the supporting frame and also constituting a pivot for the tone arm carriage to permit a pivotal movement of the same for lowering the tone arm to the sound record and for raising it therefrom, the carriage being movable along the horizontal guide rod for positioning the tone arm for operating on different areas of the sound record. The guide rod 118 which also performs the functions of a rock shaft in the up and down pivotal movement of the tone arm carriage is provided at its ends with forwardly extending rocker arms 119 and 120 preferably provided with integral collars 121 and 122 secured by set screws or other suitable means to the combined guide bar and rock shaft 118. The forwardly extending rocker arms 119 and 120 which are located respectively at the left hand end of the machine and at the right hand end thereof carry a horizontally disposed cam bar 123 which is slidably engaged by the tone arm carriage as hereinafter fully explained, and which rests upon and is supported by a roller 124 of the traveler 40ª. The combined guide and rock shaft 118 is also provided at its left hand end with a depending arm 125 preferably formed integral with the rocker arm 119 and connected at its lower end with a coil spring 126 (see Fig. 3). The coil spring 126 is preferably disposed horizontally, as clearly illustrated in Fig. 3 of the drawings, and it is connected at one end with the depending arm 125 and at the other end with a fixed portion of the machine and is adapted, when the combined guide and rock shaft 118 is free to rotate, to rotate the same partially for elevating the tone arm above the sound record, as illustrated in Fig. 3 of the drawings. This will permit the tone arm to be automatically swung outwardly with respect to the sound record for returning the tone arm to its starting position.

The cam bar preferably consists of an angle bar having one of its flanges arranged approximately horizontally and the other vertically, as clearly illustrated in Fig. 8 of the drawings. The horizontally disposed flange is slidably engaged by upper and lower rollers 127 and 128 carried by the slidable tone arm carriage and the vertical flange of the cam bar depends from the horizontal flange and is provided adjacent the left hand end with a cutout portion forming a recess 129 (see Fig. 13) adapted to receive the roller 124 of the traveler whereby when the traveler is carried to the left and approaches the limit of its movement after being moved to the right the recess 122 will permit the spring 126 to actuate the combined guide and rock shaft automatically and lift the tone arm from the sound record. The recess 122 is provided at its inner or right hand end with an inclined cam face 130 which when the traveler is again moved to the right is adapted to be engaged by the roller 124 of the traveler to lift the cam bar 123 and lower the tone arm to the sound record. The inclined cam face 130 provides for a gradual raising and lowering of the tone arm. The roller 124 is adapted to remain in the recess 129 during the aforesaid idling or silent period between the successive reproductions of the whole or selected portion of the sound record.

The tone arm carriage which is slidable along the combined guide and rock shaft 118 and which pivots or swings with the rock shaft when the same is actuated by the coil spring 126 or the roller 124 of the traveler 40ª consists of an elongated sleeve or tubular portion 131, a pair of spaced depending arms 132 and a forwardly extending approximately horizontal arm 133 (see Figs. 5, 7 and 8). The forwardly extending arm 133 carries the rollers 127 and 128, the roller 127 being preferably mounted in a bearing bracket 134. The spindle 116 extends upwardly from the tone arm carriage centrally of the tubular portion 131 and it receives a vertical sleeve 135 and a tone arm supporting element 136. The sleeve is detachably swiveled to the spindle 116 by a screen 137 which engages an annular groove 138. The sleeve is provided with an approximately horizontal supporting arm 139 having spaced laterally extending bearing bosses 140 which receive adjustable pivots or trunnions 141 preferably consisting of screws provided with tapered inner ends to engage the bearing bosses and having lock nuts 142 located exteriorly of the sides of the tone arm, as clearly illustrated in Fig. 11 of the drawings. The tone arm is preferably semi-tubular and the adjustable pivots or trunnions enable the tone arm to be properly positioned with relation to the supporting arm 139 as clearly shown in Fig. 11 of the drawings. The supporting arm 139 is provided at its outer end with an adjusting screw 143 extending upwardly through the outer end portion of the arm 139 and having a threaded engagement with the same and projecting upwardly from the arm 109 to form an adjustable support for engaging and lifting the tone arm. The lifting screw 143 supports the tone arm when the latter is lifted from the sound record and it provides the necessary clearance between it and the tone arm when the tone arm is lowered to operatively engage the reproducer stylus with the sound record.

The tone arm which is adapted to be shifted by the tone arm carriage from one area of the sound record to another is adapted to function and operatively engage its stylus with the groove of the sound record in any position to which it may be adjusted by the sliding movement of the tone arm carriage and after playing the whole or any selected portion of a sound record it is automatically returned to its starting position by a resetting lever 144 (see Fig. 8) mounted for pivotal movement on the carriage and adapted to be carried into engagement with a fixed horizontal stop rod 145 normally spaced from the resetting lever to permit the reproducer stylus to be lifted entirely clear of the sound record before swinging the tone arm horizontally to return it to its starting position. This operation prevents the reproducer stylus from injuring the groove of the sound record when it is returned to its starting position.

The resetting lever is arranged in an approximately upright position at the back of the tone arm carriage and it is pivoted at its lower portion between the depending arms 132 by pivot screws 146 which have a threaded engagement with the lower ends of the depending arms 132 and pivotally engage the resetting lever 144 at the side edges thereof, as clearly illustrated in Fig. 7 of the drawings. The upper portion of the resetting lever is forked to straddle the base of the spindle 116 and the upper ends of the sides 147 of the forked portion are bent substantially at right angles and extended forwardly and are provided with rollers 148 which engage opposite shoulders 149 of the tone arm supporting member. The tone arm supporting member is provided at opposite sides with the shoulders 149 (see Fig. 9) which are transversely aligned and which are engaged by the rollers 148 when the tone arm is swung upwardly. The setting lever is provided with spaced ears 150 between which is pivoted an adjusting lever 151 which extends above and below the pivot 152. The lower end of the adjusting lever is bent at an angle and is provided with a roller 153 which is arranged to engage the stop bar 145 and which constitutes a portion of the lower arm of the resetting lever. The member or lever 151 is adjusted by means of a screw 152 and it is adapted to be arranged to vary the distance between the roller 153 and the stop rod 144 to vary the pressure on the resetting lever and also to enable the tone arm to be lifted entirely clear of the record before the resetting lever operates to square the tone arm by swinging the tone arm outwardly to its starting position. The adjustment of the roller 153 produces the exact amount of movement and the necessary pressure required of the resetting lever to square the tone arm in returning the latter to its starting position.

The combined guide and rock shaft 118 is adapted to be manually operated to partially rotate the rock shaft by means of a lever 154 (see Fig. 7) mounted on a short shaft or pivot 155 which carries an eccentric element 156. The eccentric element 156 operates in a slot 157 of the rocker arm 120 located at the right hand end of the rock shaft 118 adjacent the upstanding end portion of the frame on which the short shaft or pivot of the lever 154 is mounted. The slot 157 in the rocker arm 120 is of sufficient depth to permit the automatic operation of the tone carriage and not interfere with the same. It will of course be understood that the cam bar 123 which rides upon the roller 124 of the traveler 40$^a$ can be lowered only when the traveler is adjusted or moved to carry the roller 124 to the recess or cut out portion 129 of the cam bar. The manually operable lever is provided at its outer end with a suitable knob to facilitate its operation.

In order to position the tone arm with relation to the element which coacts with the resetting lever so as to compensate for variations in the starting points of sound records, the lever engaged element 136 is provided with spaced lugs 159 and 160 which are located at opposite sides of the inner portion of the supporting arm 139 as clearly shown in Fig. 10 of the drawings.

The lug 159 carries a yieldable device consisting of a coil spring 161 and a pin 162 provided with a hollow portion 163 into which the inner portion of the coil spring 161 extends. The outer portion of the coil spring is arranged in a short tube or barrel 164 provided with an outer end wall against which the spring 161 bears and which is provided with an opening 165 for enabling a suitable lubricant to be readily introduced into the barrel for lubricating the barrel 163 and the pin 162 which is slidable in and guided by the barrel. An adjusting screw 166 extends through the other lug 160 and has a threaded engagement with the same and it bears against the inner portion of the supporting arm 139 at the side opposite that which is engaged by the spring actuated pin 162. The screw is adjustable to move the arm away from the lug 160 and to permit the arm to be moved toward the lug 160 by the spring actuated pin. When an adjustment has been effected between the lever engaged member 136 and the supporting arm 139, the supporting arm, the tone arm and the said member 136 are loose on the spindle 116 and are adapted to turn as a unit on the same in the horizontal swinging movement of the tone arm.

When the tone arm is lowered to the sound record 17 and the reproducer stylus 15 is operatively engaged with the spiral groove 16 of said record 17, the rotation of the sound record swings the tone arm inwardly or to the right as the reproducer stylus 15 travels in the spiral groove 16. When the tone arm is lifted from the sound record and the supporting element or relatively adjustable member of the tone arm unit is engaged by the setting lever the tone arm is swung to the left or outwardly to return it to its selected starting position and the engagement of the side portions of the resetting lever with the shoulders 149 will square the tone arm and hold the same in the exact selected starting position so that the reproducer stylus 15 will engage the selected groove of the sound record when the tone arm is lowered to the record.

Figure 19:
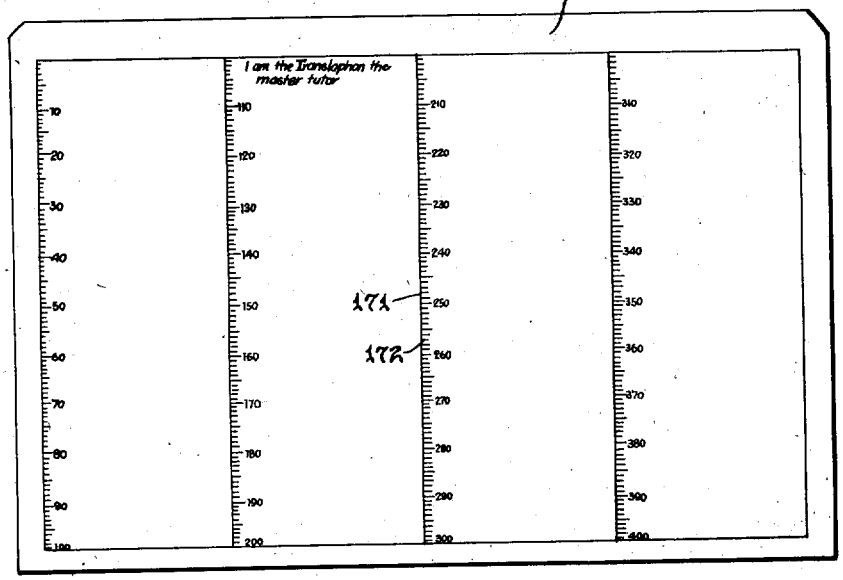
Fig. 19 is a plan view of one of the numerically indexed graduated charts.

The cabinet is provided at the inclined cover plate 3 with a chart holder 167 (see Fig. 1) of approximately U-shape having sides arranged at right angles to the bottom connecting portion and receiving a chart 168. The sides and bottom of the chart holder are approximately L-shaped in cross section to provide an inwardly extending flange 169 which projects over the side and bottom edges of the chart 168 and forms a groove for the reception of the side and bottom edges of the chart. The chart holder which may be of any other desired construction holds the chart flat against the inclined surface of the cover plate 3. The chart (see Fig. 19) is divided into four separate columns or areas 170 by division lines 171 which are provided with graduations 172.

Each of the divisions 170 has 100 graduations, the total graduations ranging from 0 to 400 and related to the pitch grooves or convolutions of the sound record and correlated with the graduations 112 of the graduated wheel 110 of the repeat mechanism. The graduated wheel 110 cooperates with an arrow or pointer 173 of an indicating member 174 (see Fig. 1) which may be in the form of a bracket and which is secured to the top plate 3 adjacent the graduated wheel at the inner side thereof so that the arrow 173 is located contiguous to the graduations 112. The divisions 170 of the chart 168 are designed to contain matter related to the contents of the sound record 17 and the material of the chart is designed to be familiar to the student or operator while the related matter on the sound record may be unfamiliar, as for instance in teaching a foreign language the sound record may contain lessons in the foreign language while the chart may have a translation of the foreign language so that the familiar form of expression of the chart and the related unfamiliar language of the sound record will be brought together and by constant repetitions of the whole or selected portions of the sound record the related portions of the chart and the sound record may become firmly fixed in the mind of the student or operator. For kindergarten instruction the chart may be provided with pictures while the sound record may contain words related to the pictures. The foregoing examples are for illustrative purposes only as the present invention is applicable to wherever it is desired to associate the unfamiliar with the familiar so that a person understanding the familiar may easily acquire the unfamiliar expressions or impressions.

In order to enable all or any selected portion of the sound record to be reproduced and repeated as often as desired the mechanism is provided with a charting arm 175 (see Figs. 1, 2 and 8) movable laterally over the chart 168 from one division 170 to another and reducing gearing hereinafter fully described is provided for transmitting motion from the charting arm to the tone arm carriage to slide the tone arm carriage inwardly and outwardly with the charting arm for arranging the tone arm at different areas of the sound record corresponding to the divisions of the chart. The said reducing gearing is provided to enable the graduations 172 to correspond to the pitch grooves of the sound record and at the same time be of sufficient size to enable the operator to distinguish readily the individual graduations of the chart and set a pointer 176 of the charting arm at any selected graduation of the chart, gearing, hereinafter described, being provided for sliding the tone arm carriage in accordance with the adjustment of the indicator 176 so that the reproducer stylus may be accurately placed in the groove of the sound record related to the selected graduation of the chart 168.

The inclined charting arm which is arranged slightly above but closely adjacent to the chart 168 is provided at its right hand side with a straight edge 177 having a scale 178 with graduations ranging from 0 to 100 to correspond with the graduations of the division lines on the chart 168. The gage formed by the graduated straight edge is adapted for the charting purposes hereinafter described and also for checking a chart should the same swell or warp and become distorted by being affected by weather conditions. The scale of the straight edge is also adapted to be employed for positioning the reproducer stylus to correspond with any point within the upper half of the first three divisions by arranging the straight edge in line with the selected point and by then bringing the indicator 176 to such selected point. The reproducer stylus will then be in position to be lowered onto the sound record in the pitch groove related to the selected spot on the chart. This will be found especially advantageous in kindergarten and other work where the matter on the chart related to the sound record content is in the form of pictures, insignia or the like.

The inclined charting arm which is hollow is preferably rectangular in cross section, as clearly shown in Fig. 17 of the drawings, and it preferably consists of a body portion 179 having a removable top plate 180. The upper end of the inclined charting arm is detachably secured between spaced upstanding lugs 181 of a charting arm carriage 182 provided with a horizontal tubular portion or sleeve 183 which is slidably mounted on a fixed horizontal transversely disposed guide rod 184. The horizontal guide rod is provided with notches 185 adapted to be engaged by a spring catch 186 consisting of a piece of resilient material arranged horizontally and secured at one end at 187 to the charting arm carriage and provided at its other end with a bend 188 arranged to engage the notches 185 of the guide rod 184, as clearly shown in Fig. 18. The notches 185 are related to the division lines 171 of the chart 168 and the spring catch 186 yieldably maintains the charting arm carriage at one of the division lines when the spring catch is in engagement with one of the notches 185. The charting arm is adapted to be moved manually from one division line to another and the spring catch 186 will operate automatically in that it will be readily disengaged from a notch when the required pressure is applied to the charting arm and will automatically engage one of the notches when the charting arm is moved to one of the division lines 171. The charting arm carriage is provided with a depending arm or portion 189 extending downwardly from the tubular portion 183 to the base of the supporting frame and provided at its lower end with spaced horizontally disposed rollers 190 located at opposite sides of a guide flange 191 which forms a rail for the rollers 190, as clearly shown in Fig. 5. The rollers and the guide flange permit the charting arm to slide on the guide rod 184 and at the same time prevent the charting arm carriage from rocking or tilting on said guide rod 184. By this construction the inclined charting arm 175 is maintained firmly in an inclined position above and in spaced relation to the chart 168. A cushioning device preferably in the form of a coil spring 192 is disposed on the guide rod 184 at the left hand end thereof contiguous to a bracket 193, extending from the upstanding end portion 35 of the supporting frame and supporting the left hand end of the guide rod 184 as clearly illustrated in Fig. 6 of the drawings. The spring 192 is arranged to be engaged by the left hand end of the tubular portion 183 of the charting arm carriage to cushion the charting arm carriage 182 and the charting arm when the charting arm is moved laterally to the left to the limit of such movement. The right hand end of the guide rod 184 is secured to the upstanding end portion 36 of the supporting frame and terminates at such end portion of the frame while the left hand end of the guide rod 184 is extended beyond the end portion 35 of the frame and is supported in said bracket 193.

The charting arm carriage is connected with an endless sprocket band 194 arranged on a large sprocket wheel 195 at the left hand side of the cabinet and on a small pulley 196 at the right hand side of the cabinet, a small idler pulley 197 being provided adjacent the large sprocket wheel in transverse alinement with the pulley 196 for guiding one of the stretches of the endless sprocket band. The band pulley 196 which is preferably flanged is mounted on a suitable bracket 198 and the idler pulley 197 is suitably mounted on the upstanding end portion 35 of the supporting frame. The endless sprocket band preferably consists of a ribbon of steel or other suitable material secured at its terminals to a rack bar 199 and the sprocket holes 200 preferably extend only a sufficient distance along the sprocket band to provide a meshing portion of sufficient length to permit the required lateral movement of the charting arm (see Fig. 2). The large sprocket wheel 195 is provided at its periphery with projections 201 to engage the holes of the endless sprocket band but any other suitable form of sprocket gearing may of course be provided. The large sprocket wheel is arranged in a plane perpendicular to the inclined plane of the charting arm and the rack bar slides in a suitable transversely disposed guide 202 of the charting arm carriage 182 and meshes with a pinion 203 of a short inclined shaft 204 journalled in the upper end portion of the charting arm and having keyed or otherwise fixed to its upper end a sprocket wheel 205. The sprocket wheel 205 which is arranged within the hollow charting arm meshes with an inclined endless sprocket band 206 arranged on the sprocket wheel 205 and on a pulley 207 located within the charting arm at the lower end thereof and mounted on a suitable stub shaft 208 secured to the bottom of the hollow charting arm as clearly illustrated in Fig. 16 of the drawings. The sprocket band is secured to a manually operable slide 209 arranged within the hollow charting arm and carrying a pointer 210 which extends through a slot 211 in the right hand side wall of the hollow charting arm, as clearly shown in Fig. 17. The pointer 210 which has a tapered or arrow shaped outer portion projects beyond the adjacent side wall of the charting arm and extends over the graduated gauge 177 and cooperates with the graduations 178 thereof. The slide which is manually operable by a knob 212 is provided with a threaded stem 213 extending through a longitudinal slot 214 in the top of the hollow charting arm and engaging an interiorly threaded socket 215 in the lower end of the knob 212. The knob 212, as shown in Fig. 17, is adapted to be grasped by the operator and moved upwardly and downwardly. When the slide is moved upwardly or downwardly the sprocket wheel 205 and the shaft 204 are rotated and motion is communicated to the transversely disposed sprocket band 194 by means of the pinion 203 and the rack bar 199. As before explained, the motion is also adapted to be imparted to the transversely disposed endless sprocket band 194 when the charting arm is manually moved laterally, the friction being sufficient to prevent the pinion 203 from rotating during such sliding movement of the charting arm.

The large sprocket wheel 195 is keyed or otherwise fixed to one end of an inclined shaft 216 journalled in a suitable bearing 217 of the supporting frame and having fixed to its other end a sprocket pinion 218 to effect a reduction in the motion transmitted from the endless sprocket band 194 to an endless sprocket band 219. The endless sprocket band 219 which is disposed transversely of the mechanism extends from the sprocket pinion 218 to a pulley 220 located at the right hand side of the cabinet. The sprocket band 219 extends across the mechanism from one side of the cabinet to the other and is provided with sprocket holes 221 which mesh with sprocket teeth or projections 222 of the sprocket pinion 218. The endless sprocket band 219 consists of a strip or ribbon of steel or other suitable material having its ends 223 and 224 secured to the tone arm carriage. A tensioning device 225 is preferably provided for adjustably connecting one end of the sprocket band 219 to the tone arm carriage. The tensioning device which may be of any desired construction is shown in the accompanying drawings consisting of an adjusting screw 226 mounted on the tone arm carriage and having a threaded engagement with a yoke 227 secured to the adjacent end of the sprocket band, as clearly illustrated in Fig. 2 of the drawings.

When either the charting arm 175 or the indicator carrying slide 209 thereof is manually moved motion will be transmitted to the tone arm carriage through the reducing gearing and the tone arm will be moved to different areas of the sound record. In the practical operation of the mechanism the charting arm is first moved to the graduated line of the division 170 in which the selected matter of the related record appears on the chart. The slide 209 is then moved along the inclined charting arm until its pointer is carried to the graduation designating the starting pitch groove or convolution of the related matter on the sound record. The graduated wheel 110 is then adjusted to space the stop block 70 the required distance from the stop block 71 for permitting the desired number of revolutions of the sound record to reproduce the selected matter of the sound record. The tone arm is then lowered to the sound record. The selected matter of the sound record will then be reproduced and continuously repeated as often as desired.

The mechanism is also adapted for charting a sound record and for this purpose the tone arm carriage is provided with a jointed foldable and swingable charting indicator 228 composed of straight sections 229 and 230 pivoted together by a horizontal pivot 231 and adapted to be folded as clearly illustrated in Fig. 1 of the drawings. The section 229 is mounted for horizontal pivotal movement on a vertical stem 232 extending upwardly from the tone arm carriage and threaded at its upper end for the reception of a clamping nut 233 which is adapted to hold the charting indicator against accidental horizontal swinging movement when the same is used for charting a sound record. The section 230 is connected by the pivot 231 to the section 229 adjacent the outer end thereof and the section 229 is provided beyond the pivot 231 with a headed projection 234 which forms a support for the section 230 when the same is in its extended operative position. The clamping nut is also adapted to hold the charting indicator when it is folded and swung horizontally out of the way as illustrated in dotted lines in Fig. 1.

When it is desired to chart a sound record the tone arm is placed in a groove of the sound record at the starting point thereof and the charting indicator is arranged in its extended position at the side of the tone arm and an adjustable electrical contact 235 is placed in contact with the tone arm. The charting indicator constitutes a portion of a signal circuit which includes an electric light bulb 236 mounted in a fixed position at the top of the cabinet as clearly shown in Fig. 1 of the drawings. The machine is then started and when the portion of the record to be charted has been played the machine is stopped with the reproducer stylus of the tone arm resting in the groove of the record. As soon as the tone arm is carried away from the charting indicator by the playing of the record the signal circuit is broken and the light bulb 236 ceases to glow. In the charting of the record the tone arm is permitted to remain stationary with the reproducer stylus in the groove of the record. The slide of the charting arm is then moved downwardly in the slot 214 until the charting indicator 228 is moved into contact with the tone arm which closes the signal circuit and causes the signal bulb 236 to glow. The signal bulb is preferably colored and the signal circuit is designed in practice to be grounded at one end on the machine. The charting indicator is designed to constitute a portion of the circuit and to be insulated from the machine so that the circuit may be closed by the contact 235 contacting with the tone arm. The adjustable contact 235 is preferably in the form of a screw which may be adjusted to touch as lightly as desired when it is moved into electrical engagement with the tone arm and in practice a low voltage current of any suitable source may be employed for the signal circuit. When one area of the sound record has been charted the number of revolutions made by the sound record is manually recorded on the chart and another section of the record may be charted in the same manner until the entire area of the record is charted and manually recorded on a graduated and numbered chart. The position of the pointer 210 should be noted before the slide 209 is operated to move the charting indicator into electrical contact with the tone arm as the distance the slide 209 moves in carrying the charting indicator to the tone arm will indicate the number of revolutions made by the sound record in playing the charted portion.

By means of the charting mechanism the selected starting position of the reproducer stylus may be manually marked on a chart at the indicated graduated points thereof and the position where the stylus comes to rest in a groove of the sound record after playing a selected portion thereof and the record stopped may also be manually marked at the indicated graduated point on the chart, so that the chart may be accurately marked to correspond to the sound record. After a blank chart has been charted to correspond with a record the subject matter of the sound record may be printed on the chart between the indicated graduated points for further use.

In Fig. 1 of the drawings the inclined charting arm 175 is shown located at the second division of the chart 168 for playing a ten inch record 17.

As a further development of the present invention, the portable machine may be provided with a projector device for showing on a screen selected portions of a picture of the chart 168 corresponding with the portions of the chart to which the charting mechanism is moved, so that when a selected portion of a sound record is played, the charting means will indicate on the chart the selected portion of the record and the projector hereinafter described will show on the screen that portion of the chart to which the charting mechanism has been moved, whereby the members of a class or other assembly may simultaneously see on the screen a picture of the portion of the chart related to the portion of the sound record being played. By these means, a large number of persons may have the advantage of the charting means and the chart.

The picture projecting device illustrated in Figs. 22 to 27, inclusive comprises in its construction a vertical housing 237 preferably mounted on the casing or cabinet 1 or other suitable fixed portions of the machine by attaching arms 238 and 239. While the housing 237 is shown in a vertical position, it may be arranged in any other suitable position with relation to a screen (not shown) upon which pictures are to be projected. The housing, which is open at its upper portion at 240, is substantially rectangular and is provided with horizontal guiding means for the reception of a horizontally slidable frame 241 having vertical guideways 242 for a vertically movable frame 243 which is adapted to receive a picture 244 of the chart 168.

The horizontally slidable frame 241 is rectangular and the vertically slidable frame 243 is also rectangular, and the picture 244 is adapted to be moved horizontally in the direction in which the charting arm 175 is moved and to be also moved vertically in the direction in which the slide 209 of the charting arm is moved so that the movements of the picture 244 will be synchronized with the movements of the charting arm and that portion of the picture 244 of the chart which corresponds to the portion of the chart indicated by the pointer 210 will be carried to the projector 245 and shown upon the screen. The vertically slidable frame 243 is provided with vertical guide grooves 246 to receive the picture 244 which is in the ordinary form of a transparent projector slide. The vertically movable frame 243 has an entrance opening 247 to permit the projector slide or picture to be introduced into and removed from the holder formed by the vertically slidable frame 243.

The horizontally slidable frame 241, which may be mounted in any desired manner within the housing to provide for its horizontal movement, is preferably provided at its bottom with antifriction rollers 248, which are arranged to run upon a track 249 located at the bottom portion of the housing 237. The horizontally slidable frame is provided at the top with a horizontal sleeve 250 which slides along a horizontal top shaft 251 adapted to form guiding means for the top of the horizontally slidable frame.

The sleeve 250 is split at the center to receive a drum 252 slidably mounted on the shaft 251 and interlocked with the same so that when the shaft 251 is rotated, the drum 252 will be rotated, and vice versa. The drum 252 has coiled around it a flexible connection 253 preferably in the form of a cord secured at one end to the drum 252 and at its other end to the vertically slidable frame or holder 243 at the center of the top thereof. The shaft 251 is preferably square and the drum 252 is provided with a square opening 254 to receive the shaft, but the sleeve may be splined or otherwise slidably interlocked with the square shaft, which has its terminals 255 rounded and journaled in suitable bearings of the housing 237 at the top thereof. The shaft 251 is rotated by the charting mechanism to raise the vertically slidable frame 243 and wind the cord 253 on the drum 252, and the weight of the frame 243 supplemented by the action of coil springs 256 move the vertically slidable frame downward and unwind the cord 253 from the drum and rotate the shaft 251 in the opposite direction from that in which it is rotated by the charting means. The springs 256 are preferably located at opposite sides of the horizontally slidable frame in a vertical position and are secured at their upper ends to the frame at 257. The lower ends of the spring are connected to cords 258 which pass around guide pulleys 259 and are secured to the vertically slidable frame at the bottom thereof at 260.

When the vertically slidable frame 243 is raised, the springs 256 are distended and will move the frame 243 downwardly when the latter is free to move.

The upper horizontal shaft 251 is connected by a belt 261 with a lower horizontal shaft 262 and is preferably in the form of a flexible cord arranged on upper and lower grooved pulleys 263 and 264 keyed or otherwise fixed to the shafts 251 and 262. The lower shaft 262, which is preferably squared, is provided at its ends with journals 265, which are arranged in suitable bearings of the attaching arms 238 and 239. The lower squared shaft receives a slidable lower drum 266 having a periphery twice the size of the peripheries of the pulleys 263 and 264 and receiving a cord 267 which extends downwardly from the drum 266 under a guide pulley 268 and is connected to the handle portion 212 of the slide 209. When the slide 209 of the charting arm 175 is moved downwardly, the cord 267 will be unwound from the lower drum 266 and the cord 253 will be wound around the upper drum 252 and as the lower drum is of twice the size of the pulleys 263 and 264, the vertically slidable frame will be moved one-half of the distance that the slide of the charting arm is moved.

When the charting arm 175 is moved to the right, the horizontally slidable frame 241 will be moved to the left, and means are provided for reducing the speed of the horizontally slidable frame and moving the same one-half the distance that the charting arm is moved. This speed reducing means consists of a pair of upper and lower endless belts 269 and 270 and upper and lower pairs of pulleys 271 and 272 mounted on short vertical shafts or spindles 273. The spindles 273 are suitably mounted in the housing at opposite sides thereof and the upper pulleys 273 which are fixed to the lower pulleys 272 have a periphery of one-half the size of the periphery of the lower pulleys 272, so that when the lower belt 270 is moved an inch, the upper belt will be moved one-half an inch. The horizontally slidable frame 241 is connected with one of the stretches of the upper belt 269 by an arm 274 of a bracket 275, and the charting arm is connected with one of the stretches of the lower belt 270 by an arm 276 of a bracket 277. The arm 276 is connected with the front stretch of the lower belt and the arm 274 of the horizontally movable frame 241 is connected with the rear stretch of the upper belt, so that when charting arm and its bracket 277, which has the arm 276, is moved to the right, the horizontally slidable frame will be moved to the left, and vice versa.

The lower drum, which has a rectangular opening 278 to fit the lower squared shaft 262, is arranged between spaced arms or bars 279 secured to the charting arm at the upper end thereof and provided with circular openings through which the lower squared shaft 262 passes. These bars 279 cause the lower drum 266 to slide on the shaft when the charting arm is moved laterally, and the bracket 277 is secured to one of the arms or bars 279. By reducing both the vertical movement and the horizontal movement of the holder 243, the size of the projector slide or picture of the chart is reduced to one-quarter of the size of the chart 168 over which the charting arm 175 moves, and it will be seen that the vertical and horizontal movements of the holder 243 and the projector slide carried by the same are synchronized with the movements of the charting means and that through the charting means the projector slide or picture of the chart may be moved backward any time and have a selected portion of the picture of the chart projected on the screen without rewinding a film.

When the slide of the charting arm is moved upwardly and the cord 267 is slackened, the springs 256 and the weight of the vertically slidable frame or holder 243 will unwind the cord 253 from the upper drum 252 and will rotate the upper and lower squared shafts and rewind the cord 267 on the lower drum.

It will be noted that the cords 253 and 267 are reversely arranged on the upper and lower drums to effect this result. When the slide is stationary, the friction of the gearing with which the slide is connected is sufficient to maintain the slide in its adjusted position and prevent any movement of the slide by the springs 256 and the weight of the vertically slidable frame or holder 243.

The projector 245 may be of any ordinary construction, and it is provided at the front of the housing with illuminating means which may be in the form of an electric light bulb 280 and a reflector 281. The portion of the projector at the front of the housing may be mounted on the same and in any desired manner, and a lens tube 282 is mounted on the housing at the rear side thereof. The lens tube in practice will be provided with suitable lenses and the housing is designed to be provided at the lens tube with a rectangular opening 283 for exposing a definite rectangular area of the projector slide or chart picture for enabling only the predetermined selected portion of the picture of the chart to be projected on the screen.

What is claimed is:—

1. A sound reproducer having a tone arm with a reproduced stylus, a motor for rotating a sound record, means for lowering the reproducer stylus onto the record, means for lifting the tone arm and reproducer stylus from the sound record after reproduction of the whole or any portion of the record, and a mechanical repeat mechanism driven by the motor and provided with means for controlling the lowering of the reproducer stylus onto the sound record and the release of the tone arm to permit the operation of said tone arm lifting means.

2. In mechanism of the class described, an amplifying unit and a dynamic speaker, a sound reproducer having a tone arm with a reproducer stylus, a motor for rotating a sound record, means for lifting the tone arm and the reproducer stylus from the sound record, a mechanical repeat mechanism driven by the motor and provided with means for lowering the tone arm to operatively engage the reproducer stylus with the sound record and for releasing the tone arm to permit the tone arm lifting means to lift the tone arm and the reproducer stylus from the sound record, and means for adjusting the repeat mechanism for controlling the number of revolutions of the sound record for all or any selected portion of the sound record including a graduated wheel having sufficient numbered graduations to control the playing of the record or any portion of the sound record so that when the graduated wheel is set at any given number in relation to a fixed pointer the reproducer stylus is lowered onto the record and will remain on the record reproducing the record content the number of grooves to which the graduated wheel has been set.

3. In mechanism of the class described, a sound reproducer having a tone arm with a reproducer stylus, a motor for rotating a sound record, means automatically operable for lifting the tone arm and reproducer stylus from the sound record after sound reproduction, a mechanical repeat mechanism driven by the motor and provided with means for lowering the reproducer stylus onto the sound record and for releasing the tone arm to permit the operation of said tone arm lifting means, means for adjusting the repeat mechanism for controlling the number of revolutions of the sound record in selected sound reproduction including a graduated wheel having graduations related to the grooves or convolutions of the sound record, and means for holding a chart of the subject matter of the sound record having graduations related to the grooves of the sound record and the graduations of said graduated wheel.

4. In mechanism for selectively reproducing and repeating sounds for teaching the related modes of expression between visual and auditory subject matter by correlating them and bringing them into coaction, a motor for rotating a sound record, means for holding a chart of the subject matter of the sound record, a sound reproducer having a tone arm with a reproducer stylus, a charting member mounted for movement over the chart, and means for transmitting motion from the charting member to the tone arm for moving the tone arm over the sound record as the charting member is moved over the chart, whereby when the charting member is moved to a desired position to register with a word, picture or other subject matter of the chart which is a familiar mode of expression the reproducer stylus will be caused to select in sound the related unfamiliar mode of expression.

5. In mechanism for selectively reproducing and repeating sounds for teaching related modes of expression of familiar visual subject matter and unfamiliar auditory subject matter by correlating and bringing them into coaction, a motor for rotating a sound record, means for holding a chart of the subject matter of the sound record, a sound reproducer having a tone arm and a reproducer stylus, a charting arm mounted for movement over the chart and having indicating means, means for transmitting motion from the charting arm to the tone arm for moving the tone arm to different positions with relation to the sound record as the charting arm is moved over the chart, whereby when the indicating means of the charting arm is moved to a desired position in registry with a familiar word, picture or other subject matter of the chart the reproducer stylus will be caused to select in sound the related unfamiliar mode of expression, and mechanical means actuated by the motor for lowering the tone arm and for causing the reproducer stylus to be lifted therefrom after sound reproduction for repeating the sound reproduction as many times as desired.

6. In mechanism for selectively reproducing and repeating sounds and for correlating and bringing into coaction related modes of expression of familiar visual subject matter and unfamiliar auditory subject matter, a motor for rotating a sound record, means for holding a chart of the subject matter of the sound record, a sound reproducer having a tone arm with a reproducer stylus, a charting member having indicating means mounted for movement over the chart, means for transmitting motion from the charting member to the tone arm for moving the tone arm with relation to the record as the charting member is moved over the chart, whereby when the charting indicating means is moved to a desired position to register with a word, picture or other subject matter of the chart the reproducer stylus will be caused to select in sound the related subject matter on the sound record, means for lifting the reproducer stylus from the sound record after sound reproduction, a mechanical repeat mechanism driven by said motor and provided with means for lowering the tone arm to operatively engage the reproducer stylus with the sound record and for releasing the tone arm to permit the tone arm to be raised by said tone arm lifting means in continuous sequence of operation to repeat the sound reproduction as many times as desired.

7. In mechanism of the class described, a motor for rotating a sound record, means for holding a chart of the subject matter of the sound record, a sound reproducer having a tone arm with a reproducer stylus, a charting member mounted for movement over the chart and provided with indicating means, means for transmitting motion from the charting arm to the tone arm for moving the tone arm to different positions with relation to the record, whereby when the indicating means of the charting member is moved to a desired position to register with a word, picture or other subject matter of the chart the reproducer stylus will be caused to select in sound the related subject matter on the sound record, automatically operable means for lifting the reproducer stylus from the sound record after sound reproduction, mechanical repeat mechanism driven from said motor and provided with means for lowering the tone arm to operatively engage the reproducer stylus with the sound record and for permitting the tone arm to be raised by said automatic means, and means for varying the record playing interval between the lowering and raising of the tone arm including a graduated wheel having substantially sufficient numbered graduations to control the whole or any portion of the sound record so that when it is set at any given number with relation to a fixed pointer the repeat mechanism will cause the reproducer stylus to remain on the sound record while the record makes the number of revolutions at which the graduated wheel is set.

8. In mechanism of the class described, a motor for rotating a sound record, means for holding a chart of the subject matter of the sound record having graduations corresponding substantially in number to the grooves of the sound record, a sound reproducer having a tone arm with a reproducer stylus, a carriage upon which the tone arm is mounted for horizontal swinging movement, a charting member mounted for movement over the chart and having indicating means, means for transmitting motion from the charting member and indicating means thereof to the carriage for moving the tone arm to different positions with relation to the record to position the reproducer stylus at a point corresponding to the position of the indicating means on the chart, and a charting indicator mounted for horizontal swinging movement on the carriage and adapted to be set at the selected starting point of the stylus and after a selected portion of the record has been played and the record stopped and the reproducer stylus comes to rest in a groove the initial position of the charting indicator may be manually noted on the chart at one of the graduated positions thereof and the charting indicator may be moved by the carriage to the tone arm through manual operation of the charting member and the indicating means thereof and the indicating means on the charting member will indicate where on the chart the exact graduated point the stylus came to rest on the record so that the chart may be accurately marked to correspond with the sound record.

9. In mechanism of the class described, a motor for rotating a sound record, means for holding a chart of the subject matter of the sound record having graduations corresponding substantially in number to the grooves of the sound record, a sound reproducer having a tone arm with a reproducer stylus, a carriage upon which the tone arm is mounted for horizontal swinging movement, a charting member mounted for movement over the chart and having indicating means, means for transmitting motion from the charting member and indicating means thereof to the carriage for moving the tone arm to different positions with relation to the record to position the reproducer stylus at a point corresponding to the position of the indicating means on the chart, a charting indicator mounted for horizontal swinging movement on the carriage and adapted to be set at the selected starting point of the stylus and after the reproducer stylus has come to rest in a groove by the stopping of the record the charting indicator may be moved by the carriage to the tone arm through manual operation of the charting member and the indicating means thereof, whereby the indicating means on the charting member will indicate the number of revolutions made by the sound record, and a signal circuit connected with the charting indicator and having a signal and provided with means for closing the circuit and for operating the signal when the charting indicator is in contact with the tone arm and for opening the circuit and rendering the signal inoperative when the tone arm moves out of contact with the charting indicator.

10. In mechanism of the class described, a motor for rotating a sound record, a sound reproducer having a tone arm with a reproducer stylus, automatically operable means for raising the tone arm to lift the reproducer stylus from a sound record after sound reproduction, mechanical repeat mechanism driven by the motor and provided with means for lowering the tone arm to the sound record and for releasing the tone arm to permit said automatic means to lift the tone arm from the record, and means for varying the interval between the lifting of the tone arm from the record and the lowering of the tone arm to the record to produce an idling of the record and a silent period between sound reproductions.

11. In mechanism of the class described, a cabinet provided with a compartment having an opening for the passage of sound waves, an amplifying unit and a dynamic speaker located within the compartment, a sound reproducer having a tone arm provided with a reproducer stylus and a pickup connected with the amplifying unit, means for rotating a sound record, and a lining located within the said compartment and partially surrounding the dynamic speaker and arranged to cushion the sound waves and improve the tone quality of sound reproductions and prevent vibration of the cabinet, said lining being arranged to permit free passage of the sound waves through the said opening of the compartment.

12. In mechanism of the class described, a motor for rotating a sound record, a sound reproducer having a tone arm with a reproducer stylus, mechanical means driven by said motor and including means for lowering the tone arm to operatively engage the reproducer stylus with the sound record, and for lifting the tone arm from the sound record after sound reproduction and for swinging the tone arm outwardly to return it to its selected starting position, and means for varying the interval between the return of the tone arm to its starting position and the lowering of the tone arm to the sound record to provide a silent period in which the sound record idles.

13. In mechanism of the class described, a sound reproducer adapted for coaction with a sound record, means for rotating the sound record, means connected with the actuating means to operatively engage said reproducer with the sound record and to withdraw the reproducer therefrom and for returning the reproducer in an elevated position to its starting point, and means for varying the interval between the return of the tone arm to the starting position after sound reproduction and the lowering of the sound reproducer to the record to provide a silent period in which the sound record idles.

14. In mechanism of the class described, a sound reproducer having a tone arm with a reproducer stylus, a motor for rotating a sound record, mechanical repeat mechanism including means for elevating the tone arm to lift the reproducer stylus from the sound record, means for swinging the tone arm outwardly to return the tone arm to its starting position, a traveler for holding the tone arm against upward movement, reversely rotating feed screws actuated by the motor, shiftable means carried by the traveler for connecting the traveler with one of the feed screws for moving the traveler in one direction and for connecting the traveler with the other feed screw for moving the traveler in the opposite direction, means for connecting the feed screws with the motor for continuously rotating the feed screws, and means cooperating with the traveler for releasing the tone arm when the traveler approaches the limit of its movement in one direction.

15. In mechanism of the class described, a sound reproducer including a tone arm with a reproducer stylus, a motor for rotating a sound record, spring actuated means for lifting the tone arm from the sound record, means for lowering the tone arm to the sound record and for holding the tone arm with its reproducer stylus in operative engagement with the sound record including a traveler, means actuated by the motor for moving the traveler back and forth, a member connected with the tone arm and engaged by the traveler while the reproducer stylus is in operative engagement with the sound record, said member being provided with means for cooperating with the traveler as it approaches the limit of one of its movements for releasing the tone arm to permit the tone arm to be raised.

16. In mechanism of the class described, a sound reproducer having a tone arm with a stylus, a motor for rotating a sound record, a traveler actuated by said motor and movable back and forth simultaneously with the rotation of the sound record, a member controlled by the traveler and connected with the tone arm for holding the same against upward movement and provided with means cooperating with the traveler to release the tone arm and permit the same to be elevated, means for elevating the tone arm when the same is free to move upwardly, and means for varying the distance the traveler moves.

17. In mechanism of the class described, a sound reproducer having a tone arm with a reproducer stylus, a motor for rotating a sound record, a traveler actuated by said motor and movable back and forth simultaneously with the rotation of the sound record, means for automatically lifting the tone arm from the sound record having a member connected with the tone arm and disposed longitudinally of the direction of movement of the traveler and engaged by the same for holding the tone arm against upward movement and provided with a cutout arranged to release the tone arm when the traveler approaches the limit of its movement in one direction to permit the tone arm to be elevated.

18. In mechanism of the class described, a sound reproducer having a tone arm with a reproducer stylus, a motor for rotating a sound record, a rocking frame having a member connected with the tone arm and provided with a cutout portion, spring means connected with the rocking frame for automatically lifting the tone arm from the sound record when the tone arm is free to move upwardly, a traveler having means for engaging the said member for holding the tone arm against upward movement, and means actuated by the motor for moving the traveler to and from the cutout portion of the said member.

19. In mechanism of the class described, a sound reproducer having a tone arm with a reproducer stylus, a motor for rotating a sound record, a rock shaft having a member connected with the tone arm, spring means for actuating the rock shaft to lift the tone arm automatically when the tone arm is free to move upwardly, a traveler movable back and forth and actuated by the said motor simultaneously with the rotation of the turntable and provided with means for slidable engagement with the said member for holding the tone arm against upward movement, and means for releasing the member from the engaged portion of the traveler when the latter approaches the limit of its movement in one direction.

20. In mechanism of the class described, a sound reproducer having a tone arm with a reproducer stylus, a motor for rotating a sound record, a traveler, means actuated by the motor for moving the traveler back and forth simultaneously with the rotation of the sound record, a bar mounted for upward and downward movement and connected with the tone arm and provided with a cutout portion, means carried by the traveler and slidably engaging the said bar for holding the tone arm against upward movement and carried by the traveler to the said cutout portion to permit upward movement of the tone arm, and spring means for automatically moving the tone arm upwardly when the bar engaging means of the traveler is carried to the said cutout portion of the bar.

21. In mechanism of the class described, a sound reproducer having a tone arm with a reproducer stylus, a motor for rotating a sound record, a traveler, means actuated by the motor for moving the traveler back and forth simultaneously with the rotation of the sound record, a bar mounted for upward and downward movement and connected with the tone arm and provided with a cutout portion, means carried by the traveler and slidably engaging the said bar for holding the tone arm against upward movement and carried by the traveler to the said cutout portion to permit upward movement of the tone arm, and spring means for automatically moving the tone arm upwardly when the bar engaging means of the traveler is carried to the said cutout portion of the bar, said bar being provided at the cutout portion with a cam edge arranged to cooperate with the bar engaging means of the traveler to gradually raise the tone arm from the sound record and also to gradually lower the tone arm to the record when the movement of the traveler is reversed to carry it away from the cutout portion of the bar.

22. In mechanism of the class described, a sound reproducer having a tone arm with a reproducer stylus, a motor for rotating a sound record, means for raising the tone arm from the sound record, and means for controlling the upward and downward movement of the tone arm for holding the tone arm against upward movement and for permitting such movement, the latter means including a traveler, reversely rotating feed screws, gearing for connecting the feed screws with the motor for continuously rotating the feed screws simultaneously with the rotation of the sound record, shiftable half nuts carried by the traveler for alternately engaging the feed screws, a shifting lever carried by the traveler and operatively connected with the nuts, and spaced means located in the path of the shifting lever for engagement with the same to operate the shifting lever and move one of the half nuts out of engagement with one of the feed screws and move the other half nut into engagement with the other feed screw for reversing the direction of movement of the traveler.

23. In mechanism of the class described, a sound reproducer having a tone arm with a reproducer stylus, a motor for rotating a sound record, and means for lowering the tone arm to the sound record and for controlling the lifting of the tone arm from the sound record including reversely rotating feed screws, gearing for connecting the feed screws with the motor for continuously rotating the feed screws during the rotation of the sound record, a traveler movable longitudinally of the feed screws, half nuts carried by the traveler, a shifting lever carried by the traveler and operatively connected with the half nuts for moving one of the half nuts out of engagement with one of the feed screws and for moving the other half nut into engagement with the other feed screw for reversing the direction of movement of the traveler, spaced stops located in the path of the shifting lever for operating the same to reverse the movement of the traveler.

24. In mechanism of the class described, a sound reproducer having a tone arm with a reproducer stylus, a motor for rotating a sound record, means for lowering the tone arm to the sound record and for controlling the lifting of the tone arm from the sound record, including reversely rotating feed screws, gearing for connecting the feed screws with the motor for continuously rotating the feed screws simultaneously with the rotation of the sound record, a traveler movable longitudinally of the feed screws, half nuts slidably mounted on the traveler, a stem connecting the nuts and having an oppositely beveled collar, a slide mounted on the traveler and provided with means for engaging the oppositely beveled collar for shifting the half nuts for moving one of the half nuts out of engagement with one of the feed screws and for carrying the other half nut into engagement with the other feed screw to reverse the direction of movement of the traveler, a shifting lever mounted on the traveler and connected with the said slide, and spaced means located in the path of the shifting lever for operating the latter.

25. In mechanism of the class described, a sound reproducer having a tone arm with a reproducer stylus, a motor for rotating a sound record, means for lowering the tone arm to the sound record and for controlling the lifting of the tone arm from the sound record including reversely rotating feed screws, gearing for connecting the feed screws with the motor for continuously rotating the feed screws simultaneously with the rotation of the sound record, a traveler movable longitudinally of the feed screws, half nuts slidably mounted on the traveler, means for connecting the half nuts with each other whereby when one half nut is moved into engagement with a feed screw the other half nut will be carried out of engagement with the other feed screw, and a manually operable plunger mounted on the traveler for engaging one of the half nuts, the latter and the plunger having cooperating means for shifting the half nuts to a neutral position with both half nuts out of engagement with the feed screws when the plunger is depressed.

26. In mechanism of the class described, a sound reproducer having a tone arm with a reproducer stylus, a motor for rotating a sound record, means for lowering the tone arm to the sound record and for controlling the lifting of the tone arm from the sound record including reversely rotating feed screws, gearing for connecting the feed screws with the motor for continuously rotating the feed screws simultaneously with the rotation of the sound record, a traveler movable longitudinally of the feed screws, half nuts slidably mounted on the traveler for engagement with the feed screws, a stem connecting the half nuts and provided with an oppositely beveled annular collar, a cage mounted in the traveler and having an opening through which the said stem passes, and an annular expansible spring mounted in the cage and surrounding the stem and engaging the collar and adapted to be expanded by the collar for cooperating with the beveled faces of the collar for maintaining either of the half nuts in engagement with the coacting feed screw.

27. In mechanism of the class described, a sound reproducer having a tone arm with a reproducer stylus, a motor for rotating a sound record, means for lowering the tone arm to the sound record and for controlling the lifting of the tone arm from the sound record including reversely rotating feed screws, gearing for connecting the feed screws with the motor for continuously rotating the feed screws simultaneously with the rotation of the sound record, a traveler movable longitudinally of the feed screws, half nuts slidably mounted on the traveler for engagement with the feed screws, a stem connecting the half nuts and provided with an oppositely beveled annular collar, a cage arranged within the traveler, an annular coil spring mounted in the cage and surrounding the stem and arranged to engage the collar thereof, a slide mounted on the traveler and connected with the cage, and operating means for moving the slide for carrying the annular coil spring from one side of the collar to the other for causing the spring to expand and engage the collar and effect a shifting of the half nuts.

28. In mechanism of the class described, a sound reproducer having a tone arm with a reproducer stylus, a motor for rotating a sound record, reversely rotating feed screws, gearing for connecting the feed screws with the motor for continuously rotating the feed screws simultaneously with the rotation of the sound record, a traveler mounted for movement longitudinally of the feed screws, shiftable half nuts carried by the traveler and movable into and out of engagement with the feed screws for causing the traveler to move back and forth, a shifting lever carried by the traveler and operatively connected with the feed screw for moving one of the half nuts out of engagement with one of the feed screws and for moving the other half nut into engagement with the other feed screw, spaced stop blocks located in the path of the shifting lever for operating the same to change the direction of movement of the traveler, a worm extending through and operatively connected with one of the stop blocks for moving the same toward and from the other stop block for varying the amount of movement of the traveler, a manually operable wheel having graduations for cooperation with a fixed pointer for indicating the amount of movement of the traveler in revolutions of the sound record, and gearing for connecting the graduated wheel with said worm.

29. In mechanism of the class described, a sound reproducer having a tone arm with a reproducer stylus, a motor for rotating a sound record, spring actuated means for automatically lifting the tone arm from the sound record including a bar connected with the tone arm and provided with a cutout portion and movable upwardly and downwardly in the lowering and raising of the tone arm, a traveler provided with means for engaging the bar for holding the tone arm against upward movement and adapted to be carried to the cutout portion of the bar to permit upward movement of the tone arm, reversely rotating feed screws continuously actuated by the motor simultaneously with the rotation of the sound record, half nuts mounted on the traveler and movable into and out of engagement with the feed screws for causing the traveler to move back and forth, a shifting lever operatively connected with the half nuts for shifting the half nuts to change the direction of movement of the traveler, spaced stop blocks arranged in the path of the shifting lever for operating them, one of the stop blocks being located adjacent the cutaway portion of the bar, and means for adjusting such stop block for varying the interval between the raising of the tone arm and the lowering of the same to permit idling of the sound record and produce a variable silent period between sound reproductions.

30. In mechanism of the class described, a sound reproducer having a tone arm with a reproducer stylus, a motor for rotating a sound record, spring actuated means for automatically lifting the tone arm from the sound record including a bar connected with the tone arm and provided with a cutout portion and movable upwardly and downwardly in the lowering and raising of the tone arm, a traveler provided with means for engaging the bar for holding the tone arm against upward movement and adapted to be carried to the cutout portion of the bar to permit upward movement of the tone arm, reversely rotating feed screws continuously actuated by the motor simultaneously with the rotation of the sound record, half nuts mounted on the traveler and movable into and out of engagement with the feed screws for causing the traveler to move back and forth, a shifting lever operatively connected with the half nuts for shifting the half nuts to change the direction of movement of the traveler, spaced stop blocks arranged in the path of the shifting lever for operating them, one of the stop blocks being located adjacent the cutaway portion of the bar, a rack bar connected with such stop block, and a manually operable shaft having a pinion meshing with the rack bar for adjusting the stop block connected therewith to vary the interval between the raising of the tone arm and the lowering of the same and to permit idling of the sound record to produce a silent period between sound reproductions.

31. In mechanism of the class described, a sound reproducer having a tone arm with a reproducer stylus, a motor for actuating a sound record, spring actuated means for automatically lifting the tone arm from the sound record including a bar connected with the tone arm and provided with a cutaway portion and movable upwardly and downwardly in the lowering and raising of the tone arm, a traveler provided with means for slidably engaging said bar for holding the tone arm against upward movement, feed screws operatively connected with the motor and continuously actuated by the same simultaneously with the rotation of the sound record, shiftable half nuts carried by the traveler and engageable with the feed screws for moving the traveler away from the cutaway portion of the bar and for returning it to the same to elevate the bar and lower the tone arm and to permit the tone arm to be raised by the said spring actuated means, a shifting lever operatively connected with the half nuts for shifting the same to change the direction of movement of the traveler, a channel member forming a guide for the stop blocks, means for adjusting one of the stop blocks for varying the playing interval of the sound record, a rack bar connected with the other stop block, a manually operable shaft having a pinion meshing with the rack bar for adjusting the associated stop block with relation to the cutaway portion of the bar for varying the interval between the raising of the tone arm and the lowering of the same to permit idling of the sound record and to produce a variable silent period between sound reproductions, a scale associated with the manually operable shaft for indicating the idle revolutions of the sound record, and yieldable means for holding the manually operable shaft in its adjustment.

32. In mechanism of the class described, a sound reproducer having a tone arm with a reproducer stylus, a motor for rotating a sound record, spring actuated means for lifting the tone arm from the sound record, a fixed horizontal guide rod, a traveler slidably mounted on the guide rod and having a depending arm provided with spaced rollers, a fixed rail located between the rollers and cooperating therewith to maintain the traveler in an upright position, reversely rotating feed screws located at opposite sides of the traveler and operatively connected with and driven by the motor simultaneously with the rotation of the sound record, shiftable nuts mounted on the traveler and located between the feed screws for engaging the feed screws to move the traveler back and forth, a shifting lever operatively connected with the half nuts for moving one of the half nuts out of engagement with one of the feed screws and for moving the other half nut into engagement with the other feed screw to reverse the direction of movement of the traveler, and means controlled by the traveler for lowering the tone arm and for holding the tone arm against upward movement and for permitting the tone arm to be lifted by the said spring actuated mechanism.

33. In mechanism of the class described, a slidable and tiltable tone arm carriage, a tone arm mounted on the carriage for horizontal swinging movement, means for tilting the tone arm carriage for raising and lowering the tone arm, a resetting lever pivotally mounted on the tone arm carriage and arranged to swing the tone arm outwardly to return it to starting position when the tone arm is raised, and a fixed stop located in the path of the resetting lever for operating the resetting lever.

34. In mechanism of the class described, a tilting tone arm carriage, a tone arm mounted for horizontal swinging movement on the carriage and having a reproducer stylus, means for tilting the carriage to raise and lower the tone arm, a resetting lever mounted on the carriage and provided with means for swinging the tone arm outwardly after sound reproduction to return the tone arm to starting position, an adjustable member mounted on and constituting a portion of the resetting lever, and a fixed stop located in the path of the adjustable member for effecting an operation of the resetting lever when the tone arm is elevated, the adjustment of the said member with relation to the fixed stop enabling the reproducer stylus to be lifted clear of a sound record before the tone arm is swung horizontally.

35. In mechanism of the class described, a slidable and tiltable tone arm carriage, tone arm supporting means mounted for horizontal swinging movement on the carriage and having alined shoulders, a tone arm carried by said supporting means, means for tilting the carriage to raise and lower the tone arm, a resetting lever fulcrumed on the tone arm carriage and having portions engageable with the said shoulders for swinging the tone arm horizontally after sound reproduction to return the tone arm to starting position, and a fixed stop located in the path of the resetting lever for operating the latter when the tone arm is moved upwardly.

36. In mechanism of the class described, a fixed horizontal guide rod, a tiltable tone arm carriage slidable on the guide rod and provided with spaced upper and lower rollers, spring actuated means for tilting the carriage to lift the tone arm from a sound record including a cam bar arranged between the rollers of the tiltable carriage and slidably receiving the same, and means for controlling the movement of the said spring actuated means for holding the tone arm against movement and for permitting operation of the said spring actuated means to raise the tone arm.

37. In mechanism of the class described, a tiltable tone arm carriage mounted for sliding movement, a tone arm mounted on the carriage for horizontal swinging movement and having a reproducer stylus, means for rotating a sound record, means slidably connected with the tone arm carriage for tilting the same for raising and lowering the tone arm, resetting means for automatically swinging the tone arm outwardly after sound reproduction to return the tone arm to starting position, and means connected with the tone arm carriage for sliding the same to different positions with relation to the sound record.

38. In mechanism of the class described, a tiltable tone arm carriage mounted for sliding movement, a tone arm mounted for horizontal swinging movement on the tone arm carriage and having a reproducer stylus, means for rotating a sound record, means for holding a chart of the contents of the sound record, a charting arm movable over the chart, and reducing gearing for transmitting movement of the charting arm to the tone arm carriage for adjusting the tone arm carriage with relation to the sound record.

39. In mechanism of the class described, a slidable tone arm carriage mounted for tilting movement, a horizontally swinging tone arm carried by said carriage, means for rotating a sound record, means for holding a chart, a charting arm mounted for sliding movement over the chart, reducing gearing including endless bands connected respectively with the tone arm carriage and the chart for transmitting motion from the tone arm to the carriage for adjusting the tone arm with relation to the sound record.

40. In mechanism of the class described, a tone arm carriage mounted for movement with relation to a sound record, a charting arm mounted for movement over a chart related to the sound record and multiplying gearing connecting the charting arm with the tone arm carriage adapted to move the tone arm carriage and to permit chart graduations related to record grooves or convolutions to be spread apart the desired distance.

41. In mechanism of the class described, a tone arm carriage mounted for sliding movement with relation to a sound record, a charting arm mounted for sliding movement to enable it to be moved over a chart related to the sound record, sprocket gearing comprising an endless sprocket band connected with the charting arm and a sprocket wheel meshing with the sprocket band and rotated by manual sliding of the charting arm, and sprocket gearing including an endless sprocket band connected with the tone arm carriage and a sprocket pinion of less diameter than the sprocket wheel connected with and actuated by the sprocket wheel, said sprocket gearing providing a differential sliding movement of the tone arm carriage and the charting arm to enable chart graduations related to sound record grooves or convolutions to be spread a desired distance apart.

42. In mechanism of the class described, a sliding tone arm carriage, a slidable charting arm carriage, gearing connecting the charting arm carriage with the tone arm carriage for enabling the tone arm carriage to be moved with relation to a sound record by manual sliding of the charting arm carriage, a guide for the charting arm carriage provided at intervals with notches, and means carried by the charting arm carriage for yieldably engaging said notches for holding the charting arm carriage yieldably at spaced points along said guide.

43. In mechanism of the class described, a tone arm carriage movable to different positions with relation to a sound record, a slidable charting arm carriage, means for guiding the charting arm carriage, a charting arm mounted on the carriage and adapted to move over a chart related to the sound record, an indicator movable along the charting arm in a direction at right angles to the direction of movement of the charting arm, sprocket gearing carried by the charting arm and having an endless band connected with the indicator of the charting arm, gearing for transmitting motion from the charting arm carriage to the tone arm carriage, and means for connecting said gearing with the sprocket gearing of the charting arm for transmitting motion from the indicator of the charting arm to the tone arm carriage.

44. In mechanism of the class described, a sliding tone arm carriage, a slidable charting arm carriage, sprocket gearing for transmitting motion from the charting arm carriage to the tone arm carriage including an endless band provided with a rack bar slidably mounted on the charting arm carriage, a charting arm carried by the charting arm carriage, an indicator movable along the charting arm, sprocket gearing mounted on the charting arm and having an endless band connected with the indicator and a pinion connected with the sprocket gearing of the charting arm and meshing with said rack bar, and manually operable means connected with the movable indicator of the charting arm.

45. In mechanism of the class described, a tone arm carriage, a slidable charting arm carriage, a charting arm mounted on the charting arm carriage for movement over a chart and provided with a graduated straight edge forming a scale, a slide mounted for movement along the charting arm and provided with a pointer movable over the said scale, sprocket gearing mounted on the charting arm and having an endless band connected with the said slide and gearing operatively connected with said sprocket gearing and connecting the charting arm carriage with the tone arm carriage whereby manual movement of the charting arm and manual movement of said slide will be transmitted to the tone arm carriage.

46. In mechanism of the class described, a tone arm carriage, a fixed guide rod, a charting arm carriage mounted on the guide rod and having a depending portion provided with spaced rollers, a fixed guide arranged between the rollers for maintaining the charting arm carriage in an upright position, an inclined charting arm secured at one end to the charting arm carriage, an indicator movable along the charting arm, gearing connecting the tone arm carriage with the movable indicator of the charting arm for transmitting to the tone arm carriage movement of said indicator and also movement of the charting arm carriage.

47. In mechanism of the class described, a tone arm carriage, a hollow charting arm, means for mounting the charting arm for sliding movement over a chart, said charting arm being provided at the top and side with longitudinal slots, a slide movable along the charting arm and having manual operating means extending through the slot in the top of the charting arm, a pointer connected with the slide and extending through the side slot of the charting arm, and gearing connecting the slide with the tone arm carriage for transmitting motion to the tone arm carriage from the sliding movement of the charting arm and also the movement of said slide along the charting arm.

48. In mechanism of the class described and means for rotating a sound record, a tone arm carriage having a tone arm and movable to different positions with relation to the sound record, means for holding a chart, a chart in the chart holding means divided into vertical columns and having numbered graduations in each column related to the grooves or convolutions of the sound record, a charting arm mounted for slidable movement over the chart from one column to another and provided with an indicator mounted for movement along the columns to cooperate with the numbered graduations thereof, and means for transmitting motion from the charting arm and the movable indicator thereof to the tone arm carriage.

49. In mechanism of the class described, a motor for rotating a sound record, a sound reproducer having a tone arm with a reproducer stylus, means for lowering the reproducer stylus onto the record, means for lifting the reproducer stylus from the sound record after reproduction of the whole or any portion of the record, a mechanical repeat mechanism driven by the motor and provided with means for controlling the lowering of the reproducer stylus onto the sound record and the raising of the reproducer stylus therefrom, and an adjustable means for the repeat mechanism for permitting the whole or any portion of the record to be played and repeated, the latter means being associated with an indicating chart containing the subject matter of the sound record and having graduations for designating the starting and finishing points of the stylus for any selected portion.

50. In mechanism of the class described, charting means movable over a chart related to a sound record, a projector for showing on a screen selected portions of a picture of the chart, and mechanism synchronized with the charting means for moving the picture of the chart simultaneously with the charting means for projecting on the screen a picture of the selected portion of the chart to which the charting means has been moved.

51. In mechanism of the class described, charting means movable over a chart related to a sound record, a projector for showing on a screen selected portions of a picture of the chart and mechanism synchronized with the charting means for moving the picture of the chart simultaneously with the charting means at a slower rate of speed than the charting means whereby a picture of the chart of less size than the chart may be used in the projector and enlarged by the projector when shown on the screen.

52. In mechanism of the class described, charting means including a slidable charting arm movable back and forth over a chart and having a slide carrying a pointer and movable over the chart in a direction at right angles to the direction of movement of the charting arm, a projector, a slidable frame associated with the projector and provided with guiding means arranged at right angles to the direction of movement of the slidable frame, a holder slidably mounted in the guiding means of said frame and adapted to receive a picture of a chart related to a sound record, means for transmitting motion from the charting arm to said slidable frame, and means for transmitting motion from the slide of the charting arm to the said holder, said motion transmitting means synchronizing the movements of the picture of the chart with the movement of the charting means over the chart for automatically exposing to the projector portions of the picture corresponding to selected portions of the chart to which the charting means is moved.

53. In mechanism of the class described, a picture projecting device comprising a housing having horizontal guiding means, a frame mounted in the housing and slidable horizontally and provided with vertical guiding means, a holder slidable in the vertical guiding means and adapted to receive a picture of a chart related to a sound record, upper and lower horizontal shafts, means for transmitting motion from one shaft to the other, a drum slidably mounted on the upper horizontal shaft and carried by the horizontally slidable frame and having a flexible member adapted to be wound around and unwound from the drum and connected with said holder, a drum slidable on the lower horizontal shaft and having a flexible member, means for sliding the lower drum on the lower shaft and for operating the flexible member of the lower drum, spaced pulleys arranged in pairs, the members of each pair being connected with each other, endless belts arranged on the pulleys, means for connecting the horizontally slidable frame with one of the belts, and means for connecting the lower slidable drum with the other endless belt.

54. In mechanism of the class described, a projector, a horizontally slidable frame, a vertically slidable frame mounted in the horizontally slidable frame and carried by the same and adapted to receive a picture of a chart related to a sound record, upper and lower horizontal shafts and upper drums slidable on the upper horizontal shaft and carried by the slidable frame and having a flexible member connected with the vertically slidable frame, upper and lower pulleys mounted on the said shafts, a belt arranged on said pulleys, a lower drum slidably mounted on the lower shaft and being of greater size than the pulley of the lower shaft for reducing the speed of the upper shaft, and speed reducing means for transmitting the sliding movement of the lower drum to the sliding frame comprising spaced pulleys arranged in pairs, the members of each pair being of different sizes, endless belts arranged on the pulleys, and means for connecting the belt of the smaller pulleys with the horizontally slidable frame and the belt of the larger pulleys with the lower slidable drum.

55. In mechanism of the class described, a tone arm carriage mounted for movement with relation to a sound record, charting means mounted for movement over a chart related to the sound record, gearing connecting the charting means with the tone arm carriage for actuating the latter, a projector, a holder adapted to receive a picture of the chart, and means for connecting the holder with the charting means for moving the holder with relation to the projector simultaneously with the movement of the charting means over the chart.

56. In mechanism of the class described, a projector, a holder adapted to receive a picture of a chart related to a sound record, and means for mounting the holder for sliding movement in a plurality of different angularly related directions to expose different selected areas of the picture of the chart to the projector.

57. In mechanism of the class described, charting means movable over a chart, a projector for showing on a screen pictures of subject matter related to the chart and mechanism synchronized with the charting means for moving the pictures of said subject matter simultaneously with the charting means for projecting on the screen a picture related to a selected portion of the chart to which the charting means has been moved.

58. In mechanism of the class described, charting means movable over a chart, a projector for showing on a screen pictures of subject matter related to the chart, and means synchronized with the charting means for moving the pictures of said subject matter simultaneously with the charting means at a slower rate of speed than the charting means whereby a picture related to the chart of less size than the chart may be used in the projector and enlarged by the projector when shown on the screen.

ARTHUR L. RUNYAN.

CERTIFICATE OF CORRECTION.

Patent No. 2,082,261.                                June 1, 1937.

ARTHUR L. RUNYAN.

It is hereby certified that error appears in the printed specification of the above numbered patent requiring correction as follows: Page 5, second column, line 67, for "screen 137" read screw 137; page 11, first column, line 16, claim 1, for "reproduced" read reproducer; and that the said Letters Patent should be read with these corrections therein that the same may conform to the record of the case in the Patent Office.

Signed and sealed this 24th day of August, A. D. 1937.

Leslie Frazer (Seal)                                      Acting Commissioner of Patents.

ing a flexible member adapted to be wound around and unwound from the drum and connected with said holder, a drum slidable on the lower horizontal shaft and having a flexible member, means for sliding the lower drum on the lower shaft and for operating the flexible member of the lower drum, spaced pulleys arranged in pairs, the members of each pair being connected with each other, endless belts arranged on the pulleys, means for connecting the horizontally slidable frame with one of the belts, and means for connecting the lower slidable drum with the other endless belt.

54. In mechanism of the class described, a projector, a horizontally slidable frame, a vertically slidable frame mounted in the horizontally slidable frame and carried by the same and adapted to receive a picture of a chart related to a sound record, upper and lower horizontal shafts and upper drums slidable on the upper horizontal shaft and carried by the slidable frame and having a flexible member connected with the vertically slidable frame, upper and lower pulleys mounted on the said shafts, a belt arranged on said pulleys, a lower drum slidably mounted on the lower shaft and being of greater size than the pulley of the lower shaft for reducing the speed of the upper shaft, and speed reducing means for transmitting the sliding movement of the lower drum to the sliding frame comprising spaced pulleys arranged in pairs, the members of each pair being of different sizes, endless belts arranged on the pulleys, and means for connecting the belt of the smaller pulleys with the horizontally slidable frame and the belt of the larger pulleys with the lower slidable drum.

55. In mechanism of the class described, a tone arm carriage mounted for movement with relation to a sound record, charting means mounted for movement over a chart related to the sound record, gearing connecting the charting means with the tone arm carriage for actuating the latter, a projector, a holder adapted to receive a picture of the chart, and means for connecting the holder with the charting means for moving the holder with relation to the projector simultaneously with the movement of the charting means over the chart.

56. In mechanism of the class described, a projector, a holder adapted to receive a picture of a chart related to a sound record, and means for mounting the holder for sliding movement in a plurality of different angularly related directions to expose different selected areas of the picture of the chart to the projector.

57. In mechanism of the class described, charting means movable over a chart, a projector for showing on a screen pictures of subject matter related to the chart and mechanism synchronized with the charting means for moving the pictures of said subject matter simultaneously with the charting means for projecting on the screen a picture related to a selected portion of the chart to which the charting means has been moved.

58. In mechanism of the class described, charting means movable over a chart, a projector for showing on a screen pictures of subject matter related to the chart, and means synchronized with the charting means for moving the pictures of said subject matter simultaneously with the charting means at a slower rate of speed than the charting means whereby a picture related to the chart of less size than the chart may be used in the projector and enlarged by the projector when shown on the screen.

ARTHUR L. RUNYAN.

CERTIFICATE OF CORRECTION.

Patent No. 2,082,261.  June 1, 1937.

ARTHUR L. RUNYAN.

It is hereby certified that error appears in the printed specification of the above numbered patent requiring correction as follows: Page 5, second column, line 67, for "screen 137" read screw 137; page 11, first column, line 16, claim 1, for "reproduced" read reproducer; and that the said Letters Patent should be read with these corrections therein that the same may conform to the record of the case in the Patent Office.

Signed and sealed this 24th day of August, A. D. 1937.

(Seal)

Leslie Frazer
Acting Commissioner of Patents.

CERTIFICATE OF CORRECTION.

Patent No. 2,082,261.                                June 1, 1937.

ARTHUR L. RUNYAN.

It is hereby certified that error appears in the printed specification of the above numbered patent requiring correction as follows: Page 5, second column, line 67, for "screen 137" read screw 137; page 11, first column, line 16, claim 1, for "reproduced" read reproducer; and that the said Letters Patent should be read with these corrections therein that the same may conform to the record of the case in the Patent Office.

Signed and sealed this 24th day of August, A. D. 1937.

Leslie Frazer (Seal)                                    Acting Commissioner of Patents.